United States Patent
Huang et al.

(10) Patent No.: US 12,374,087 B2
(45) Date of Patent: Jul. 29, 2025

(54) NEURAL NETWORK TRAINING METHOD, IMAGE CLASSIFICATION SYSTEM, AND RELATED DEVICE

(71) Applicant: HUAWEI TECHNOLOGIES CO., LTD., Guangdong (CN)

(72) Inventors: Weiran Huang, Beijing (CN); Zhenguo Li, Hong Kong (CN); Aoxue Li, Beijing (CN); Liwei Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 17/993,507

(22) Filed: Nov. 23, 2022

(65) Prior Publication Data
US 2023/0087526 A1  Mar. 23, 2023

Related U.S. Application Data

(63) Continuation of application No. PCT/CN2021/073688, filed on Jan. 26, 2021.

(30) Foreign Application Priority Data

May 26, 2020  (CN) ........................ 202010454031.X

(51) Int. Cl.
G06V 10/774  (2022.01)
G06V 10/82  (2022.01)

(52) U.S. Cl.
CPC ............ G06V 10/774 (2022.01); G06V 10/82 (2022.01)

(58) Field of Classification Search
CPC .... G06V 10/774; G06V 10/82; G06V 10/761; G06V 20/30; G06V 20/52; G06V 20/56;
(Continued)

(56) References Cited

U.S. PATENT DOCUMENTS 8,340,405 B2 * 12/2012 Cooper ................. G06V 20/10
382/190
8,886,579 B2 * 11/2014 De Sousa Webber .. G06F 40/30
706/18
(Continued)

FOREIGN PATENT DOCUMENTS

CN  111797893 A  10/2020

OTHER PUBLICATIONS

"Zero-Shot Learning on Semantic Class Prototype Graph"; Zhenyong Fu, IEEE Transactions on Pattern Analysis and Machine Intelligence (vol. 40, Issue: 8, 2018, pp. 2009-2022) (Year: 2018).*

(Continued)

*Primary Examiner* — Michael S Osinski
(74) *Attorney, Agent, or Firm* — WOMBLE BOND DICKINSON (US) LLP

(57) ABSTRACT

A neural network training method, an image classification system, and a related device, which may be applied to the artificial intelligence field. Feature extraction is performed on images in a training set (including a first set and a second set) by using a prototype network, to obtain first feature points, in a feature space, of a plurality of images in the first set and second feature points of a plurality of images in the second set. The first feature points are used for calculating a prototype of a class of an image, and the second feature points are used for updating a network parameter of the prototype network. A semantic similarity between classes of the images in the second set is obtained, to calculate a margin value between the classes of the images. Then, a loss function is adjusted based on the margin value.

20 Claims, 17 Drawing Sheets

(58) Field of Classification Search
CPC ........ G06V 40/16; G06N 3/084; G06N 3/045;
G06N 3/08; G06N 20/00; G06N 20/10;
G06N 3/04; G06N 3/0464; G06N 3/047;
G06N 5/02; G06N 7/01; Y02T 10/40;
G06F 18/245; G06F 16/55; G06F 18/22;
G06F 18/24; G06F 18/214; G06F 18/217;
G06F 18/2431; G06F 40/30; G06F 18/23;
G06F 18/213; G06F 17/18; G06T
2207/20084; G06T 2207/20081; G06T
7/00

See application file for complete search history.

(56) References Cited

U.S. PATENT DOCUMENTS

| | | | | |
|---|---|---|---|---|
| 9,684,706 | B2* | 6/2017 | Satzke | G06F 9/5066 |
| 10,387,749 | B2* | 8/2019 | Movshovitz-Attias | |
| | | | | G06F 18/217 |
| 10,410,353 | B2* | 9/2019 | Feng | G06N 3/08 |
| 11,568,245 | B2* | 1/2023 | Chang | G06N 5/02 |
| 11,574,198 | B2* | 2/2023 | Son | G06N 3/045 |
| 12,217,485 | B2* | 2/2025 | Sawada | G06F 16/55 |
| 2012/0254077 | A1* | 10/2012 | Porikli | G06N 20/10 |
| | | | | 706/12 |
| 2015/0134577 | A1* | 5/2015 | Yu | G06N 20/00 |
| | | | | 706/46 |
| 2017/0228641 | A1* | 8/2017 | Sohn | G06F 17/11 |
| 2018/0165546 | A1* | 6/2018 | Skans | G06N 3/045 |
| 2020/0097742 | A1* | 3/2020 | Ratnesh Kumar | G06N 3/047 |
| 2020/0134375 | A1* | 4/2020 | Zhan | G06V 30/19173 |
| 2020/0134382 | A1* | 4/2020 | Zhuravlev | G06F 18/217 |
| 2020/0210768 | A1* | 7/2020 | Turkelson | G06T 7/0002 |
| 2020/0234196 | A1* | 7/2020 | Nishino | G06F 18/214 |
| 2020/0257975 | A1* | 8/2020 | Chang | G06F 40/30 |
| 2020/0312056 | A1* | 10/2020 | Wang | G06N 20/10 |
| 2020/0320709 | A1* | 10/2020 | Geipel | G06F 18/214 |
| 2020/0338454 | A1* | 10/2020 | Kim | G06F 21/36 |
| 2020/0380338 | A1* | 12/2020 | Matsumura | G06F 18/22 |
| 2021/0003700 | A1* | 1/2021 | Zhai | G06N 3/045 |
| 2021/0271924 | A1* | 9/2021 | Tarumi | G06F 18/2411 |
| 2021/0319880 | A1* | 10/2021 | Tomii | G16H 50/70 |
| 2021/0341911 | A1* | 11/2021 | Joshi | G06N 3/045 |
| 2022/0129697 | A1* | 4/2022 | Jog | G06V 10/82 |
| 2022/0129791 | A1* | 4/2022 | Nia | G06F 18/2414 |
| 2022/0139069 | A1* | 5/2022 | Toizumi | G06V 10/774 |
| | | | | 706/12 |
| 2022/0188707 | A1* | 6/2022 | Kingetsu | G06F 18/22 |
| 2022/0207307 | A1* | 6/2022 | Kingetsu | G06F 18/217 |
| 2022/0215294 | A1* | 7/2022 | Kingetsu | G06N 20/10 |
| 2022/0237407 | A1* | 7/2022 | Umeda | G06F 18/2431 |
| 2023/0062289 | A1* | 3/2023 | Amma | G06V 10/82 |
| 2023/0196726 | A1* | 6/2023 | Deng | G06V 10/762 |
| | | | | 382/128 |

OTHER PUBLICATIONS

F. Sung, Y. Yang, L. Zhang, T. Xiang, P. H. S. Torr and T. M. Hospedales, "Learning to Compare: Relation Network for Few-Shot Learning," 2018 IEEE/CVF Conference on Computer Vision and Pattern Recognition, Salt Lake City, UT, USA, Jun. 18-23, 2018, pp. 1199-1208, doi: 10.1109/CVPR.2018.00131.

Aoxue Li et al:"Boosting Few-Shot Learning With Adaptive Margin Loss." arXiv:2005.13826v1. May 28, 2020. total 9 pages.

Y. L. Cacheux, H. L. Borgne and M. Crucianu, "Modeling Inter and Intra-Class Relations in the Triplet Loss for Zero-Shot Learning," 2019 IEEE/CVF International Conference on Computer Vision (ICCV), Seoul, Korea (South), Oct. 27, 2019, pp. 10332-10341, doi: 10.1109/ICCV.2019.01043.

H. Wang et al., "CosFace: Large Margin Cosine Loss for Deep Face Recognition," 2018 IEEE/CVF Conference on Computer Vision and Pattern Recognition, Salt Lake City, UT, USA, Jun. 18-23, 2018, pp. 5265-5274, doi: 10.1109/CVPR.2018.00552.

Deng, J. Guo, N. Xue and S. Zafeiriou, "ArcFace: Additive Angular Margin Loss for Deep Face Recognition," 2019 IEEE/CVF Conference on Computer Vision and Pattern Recognition (CVPR), Long Beach, CA, USA, Jun. 15-20, 2019, pp. 4685-4694, doi: 10.1109/CVPR.2019.00482.

Jake Snell et al."Prototypical Networks for Few-shot Learning." Jun. 19, 2017. arXiv:1703.05175v2, total13 pages.

* cited by examiner

| Model | Network structure | Type | Accuracy 5-way 1-shot | 5-way 5-shot |
|---|---|---|---|---|
| Matching Networks | 4Conv | Metric | 43.56 ± 0.84 | 55.31 ± 0.73 |
| Prototypical Network | 4Conv | Metric | 49.42 ± 0.78 | 68.20 ± 0.66 |
| Relation Networks | 4Conv | Metric | 50.44 ± 0.82 | 65.32 ± 0.70 |
| GCR | 4Conv | Metric | 53.21 ± 0.40 | 72.34 ± 0.32 |
| Memory Matching Network | 4Conv | Metric | 53.37 ± 0.48 | 66.97 ± 0.35 |
| Dynamic FSL | 4Conv | Metric | 56.20 ± 0.86 | 73.00 ± 0.64 |
| Prototypical Network | ResNet12 | Metric | 56.52 ± 0.45 | 74.28 ± 0.20 |
| TADAM | ResNet12 | Metric | 58.50 ± 0.30 | 76.70 ± 0.38 |
| DC | ResNet12 | Metric | 62.53 ± 0.19 | 78.95 ± 0.13 |
| TapNet | ResNet12 | Metric | 61.65 ± 0.15 | 76.36 ± 0.10 |
| ECMSFMT | ResNet12 | Metric | 59.00 | 77.46 |
| AM3 (Prototypical Network) | ResNet12 | Metric | 65.21 ± 0.49 | 75.20 ± 0.36 |
| MAML | 4Conv | Gradient | 48.70 ± 1.84 | 63.11 ± 0.92 |
| MAML++ | 4Conv | Gradient | 52.15 ± 0.26 | 68.32 ± 0.44 |
| iMAML | 4Conv | Gradient | 49.30 ± 1.88 | - |
| LCC | 4Conv | Gradient | 54.6 ± 0.4 | 71.1 ± 0.4 |
| CAML | ResNet12 | Gradient | 59.23 ± 0.99 | 72.35 ± 0.18 |
| MTL | ResNet12 | Gradient | 61.20 ± 1.80 | 75.50 ± 0.80 |
| MetaOptNet-SVM | ResNet12 | Gradient | 62.64 ± 0.61 | 78.63 ± 0.46 |
| Prototypical Network + TRAML | ResNet12 | Metric | 60.31 ± 0.48 | 77.94 ± 0.57 |
| AM3 (Prototypical Network) + TRAML | ResNet12 | Metric | 67.10 ± 0.52 | 79.54 ± 0.60 |

This application

FIG. 8

| Model | New class | | | | | New class + base class | | | | |
|---|---|---|---|---|---|---|---|---|---|---|
| | $n_{way}=5$ | 2 | 5 | 10 | 20 | $n_{way}=5$ | 2 | 5 | 20 | 80 |
| Logistic regression | 38.4 | 51.1 | 64.8 | 71.6 | 76.6 | 40.8 | 49.9 | 64.2 | 71.9 | 76.9 |
| Logistic regression w/H | 40.7 | 50.8 | 62.0 | 69.3 | 76.5 | 52.1 | 59.4 | 67.6 | 72.8 | 76.9 |
| Prototypical Network | 39.3 | 54.5 | 66.3 | 71.2 | 73.9 | 49.5 | 61.0 | 69.7 | 72.9 | 74.6 |
| Matching Networks | 43.6 | 54.0 | 66.0 | 72.2 | 76.9 | 54.4 | 61.0 | 69.0 | 73.7 | 76.5 |
| Squared Gradient Magnitude w/H | - | - | - | - | - | 54.3 | 62.1 | 71.3 | 75.8 | 78.1 |
| Batch Squared Gradient Magnitude | - | - | - | - | - | 49.3 | 60.5 | 71.4 | 75.8 | 78.5 |
| Prototype Matching Nets | 43.3 | 55.7 | 68.4 | 74.9 | 77.0 | 55.8 | 63.1 | 71.1 | 75.0 | 77.1 |
| Prototype Matching Nets w/H | 45.8 | 57.8 | 69.0 | 74.3 | 77.4 | 57.6 | 64.7 | 71.9 | 75.2 | 77.5 |
| Dynamic FSL | 46.0 | 57.5 | 69.2 | 74.8 | 78.1 | 58.2 | 65.2 | 72.2 | 76.5 | 78.7 |
| Dynamic FSL + TRAML | 48.1 | 59.3 | 70.3 | 76.4 | 79.3 | 59.2 | 66.3 | 73.6 | 77.3 | 80.2 |

└─ This application

FIG. 9

FIG. 14

NEURAL NETWORK TRAINING METHOD, IMAGE CLASSIFICATION SYSTEM, AND RELATED DEVICE

CROSS-REFERENCE TO RELATED APPLICATIONS

This application is a continuation of International Application No. PCT/CN2021/073688, filed on Jan. 26, 2021, which claims priority to Chinese Patent Application No. 202010454031.X, filed on May 26, 2020. The disclosures of the aforementioned applications are hereby incorporated by reference in their entireties.

TECHNICAL FIELD

This disclosure relates to the field of machine learning, and in particular, to a neural network training method, an image classification system, and a related device.

BACKGROUND

Image recognition and classification are a basis of various image processing applications. Currently, although a machine learning algorithm has superb performance in image recognition and classification, the machine learning algorithm highly relies on a large amount of labeled training data. For many rare classes, it is infeasible or event impossible to collect a large quantity of training samples. This seriously limits scalability of the machine learning algorithm. By contrast, with the help of abundant previously accumulated knowledge, humans can easily recognize a new class after seeing the class only once. Inspired by this ability of humans to recognize a new class by using a small quantity of samples, researchers have begun to study few-shot classification problems.

Among the few-shot classification problems, a problem that most urgently needs to be resolved is overfitting of data. Because a data volume is excessively small, a general classification algorithm presents an overfitting phenomenon, causing a large error between a classification result and an actual result. To reduce impact of overfitting caused by an excessively small data volume, a metric-based meta-learning method may be used, and a prototype network emerges based on the meta-learning method. The prototype network projects samples to a metric space (or referred to as a feature space), and each sample may be projected as a point (which may be referred to as a feature point or an eigenvector) in the feature space. Then a distance (for example, a Euclidean distance) between a sample and a class center corresponding to a class of each image in the feature space is measured to determine a class to which the sample belongs.

However, in the feature space, when distances between a feature point of the sample and class centers of classes of at least two images are close or even difficult to distinguish, a classification result of the sample has a large error, limiting classification accuracy. Based on this, a solution capable of implementing accurate classification under a few-shot condition is required.

SUMMARY

Embodiments of this disclosure provide a neural network training method, an image classification system, and a related device, to introduce an adaptive margin value into a loss function of a prototype network, and add a larger margin value between similar classes and add a smaller margin value between less similar classes to adaptively adjust a margin between classes, so as to more easily distinguish between classes, where a margin value is determined based on a semantic similarity between classes.

Based on this, embodiments of this disclosure provide the following technical solutions:

According to a first aspect, an embodiment of this disclosure first provides a neural network training method. The method may be applied to the artificial intelligence field. First, a training device obtains a training set, where the training set may include a plurality of groups of training data (each group of training data may be referred to as a meta-task), and the training set may include a first set (which may also be referred to as a support set) and a second set (which may also be referred to as a query set). For example, a group of training data may be divided into a first set and a second set, and if the training set includes a plurality of groups of training data, each group of training data may be divided into a first set and a second set. Classes of images in the first set correspond to classes of images in the second set. To be specific, the classes of the images in the first set are the same as the classes of the images in the second set. For example, classes of images in the first set are three classes: "pig", "elephant", and "car". In this case, classes of images in the second set are also the three classes: "pig", "elephant", and "car". Then, the training device performs feature extraction on images in each group of training data by using a prototype network based on the plurality of groups of training data in the training set, to obtain feature points of images in each group of training data in a feature space. A point in the feature space (namely, a feature point) is obtained by performing feature extraction on each image in the training set by using the prototype network. The obtained feature points include first feature points corresponding to the images in the first set and second feature points corresponding to the images in the second set. Herein, it should be noted that the first feature points obtained through extraction are used for calculating a prototype corresponding to a class of each image. The prototype is used for indicating a class center of a position, in the feature space, of a first feature point corresponding to a class of each image. The training device further obtains a semantic similarity between the classes of the images in the second set, and obtains a margin value between the classes of the images in the second set based on the semantic similarity. After obtaining the margin value between the classes of the images in the second set, the training device may adjust a loss function of the prototype network based on at least the margin value, where the loss function of the prototype network may be referred to as an objective loss function. After adjusting the objective loss function based on at least the margin value, the training device may train the prototype network based on the first feature points and the second feature points, in the feature space, of the first set and the second set in each group of training data and by using an adjusted objective loss function.

In an embodiment, first, feature extraction is performed on images in the training set (including the first set and the second set) by using the prototype network, to obtain a feature point, in the feature space, that corresponds to each image in the training set (including the first feature points corresponding to the images in the first set and the second feature points corresponding to the images in the second set). The first feature points are used for calculating a prototype of a class of each image (the prototype is used for indicating a class center of a position, in the feature space, of a first feature point corresponding to a class of each image). The second feature points are used for updating a network parameter of the prototype network (the network parameter determines a position of a feature point obtained by projecting an image to the feature space). That is, the network parameter of the prototype network needs to be learned by using the second feature points. If a value of a learned network parameter is desired, a distance between feature points, in the feature space, of images of a same class is short. Based on this, a desired objective loss function needs to be constructed. In an embodiment of this disclosure, first, the semantic similarity between the classes of the images in the second set is obtained, and the margin value between the classes of the images in the second set is obtained based on the semantic similarity. If semantic similarities between classes of images are different, margin values between the classes of the images are also different. Finally, the objective loss function is adjusted based on at least the margin value. After the objective loss function is adjusted, the images in the training set are trained by using the prototype network, so that a final objective function reaches a preset value. In this embodiment of this disclosure, the adaptive margin value is introduced into the loss function of the prototype network. To be specific, a larger margin value is added between similar classes, and a smaller margin value is added between less similar classes, to adaptively adjust a margin between classes, so as to more easily distinguish between classes, thereby improving classification accuracy of the prototype network.

In an embodiment, semantic vectors corresponding to classes of images are extracted by using a semantic feature extraction module, where one class of an image corresponds to one semantic vector. Then a Euclidean distance between every two of the semantic vectors is calculated. A first semantic vector and a second semantic vector in the semantic vectors are used as examples. It is assumed that the first semantic vector and the second semantic vector are obtained by using the semantic feature extraction module based on a class of a first image and a class of a second image respectively. In this case, after a Euclidean distance between the first semantic vector and the second semantic vector is calculated, a semantic similarity between the class of the first image and the class of the second image may be determined based on the Euclidean distance. Usually, a Euclidean distance and a semantic similarity are in a negative correlation relationship. To be specific, a larger calculated Euclidean distance between two semantic vectors indicates a higher dissimilarity (that is, a lower semantic similarity) between classes, of images, that respectively correspond to the two semantic vectors, for example, a semantic similarity between "dog" and "sofa" is low; on the contrary, a smaller calculated Euclidean distance between two semantic vectors indicates a higher similarity (that is, a higher semantic similarity) between classes, of images, that respectively correspond to the two semantic vectors, for example, a semantic similarity between "dog" and "wolf" is high.

In the foregoing embodiments of this disclosure, a specific implementation of obtaining a semantic similarity between classes of images is described.

In an embodiment, semantic vectors corresponding to classes of images are extracted by using a semantic feature extraction module, where one class of an image corresponds to one semantic vector. Then an inner product operation is performed between every two of the semantic vectors to obtain an inner product operation result. A first semantic vector and a second semantic vector in the semantic vectors are still used as examples for description. It is assumed that the first semantic vector and the second semantic vector are obtained by using the semantic feature extraction module based on a class of a first image and a class of a second image respectively. In this case, an inner product (which may also be referred to as a scalar product or a dot product) operation may be performed on the first semantic vector and the second semantic vector, that is, dot multiplication is performed on the first semantic vector and the second semantic vector, to obtain a dot multiplication result (namely, an inner product operation result). Then a semantic similarity between the class of the first image and the class of the second image may be determined based on the inner product operation result. Usually, an inner product operation result and a semantic similarity are in a positive correlation relationship. To be specific, a calculated inner product operation result between two semantic vectors being closer to 1 (assuming that the inner product operation result has been normalized) indicates a higher similarity (that is, a higher semantic similarity) between classes, of images, that respectively correspond to the two semantic vectors, for example, a semantic similarity between "dog" and "wolf" is high; on the contrary, a calculated inner product operation result between two semantic vectors being closer to 0 indicates a higher dissimilarity (that is, a lower semantic similarity) between classes, of images, that respectively correspond to the two semantic vectors, for example, a semantic similarity between "dog" and "sofa" is low.

In the foregoing embodiment of this disclosure, another specific implementation of obtaining a semantic similarity between classes of images is described.

In an embodiment, after the semantic similarity between the classes of the images is obtained, the margin value between the classes of the images in the second set may be obtained based on the semantic similarity. Specifically, the margin value between the classes of the images in the second set may be obtained in the following manner: performing a linear operation on the semantic similarity by using an objective operation formula, to obtain a margin value between every two of the classes of the images in the second set, where the objective operation formula includes at least one parameter variable. In this manner, the objective operation formula includes at least one parameter variable, and a value of the at least one parameter variable needs to be determined by learning the images in the second set.

In the foregoing embodiment of this disclosure, the margin value between every two of the classes of the images in the second set is obtained by using the objective operation formula. This manner is simple and convenient, has a small quantity of parameter variables, and makes training easy.

In an embodiment, after the semantic similarity between the classes of the images is obtained, the margin value between the classes of the images in the second set may be obtained based on the semantic similarity. Specifically, the margin value between the classes of the images in the second set may be obtained in the following another manner: using the semantic similarity as input of a preset neural network to obtain an output result, where the output result is the margin value between every two of the classes of the images in the second set.

In the foregoing embodiment of this disclosure, the margin value between every two of the classes of the images in the second set is obtained by using the preset neural network. A network parameter class obtained through training in this manner is more accurate and has high accuracy.

In an embodiment, if the margin value between every two of the classes of the images in the second set is obtained by using the objective operation formula, in a process of training the prototype network by using the adjusted objective loss function, the value of the at least one parameter variable included in the objective operation formula is adjusted.

In an embodiment, if the margin value between every two of the classes of the images is obtained by using the objective operation formula, in a process of training the prototype network, the objective operation formula and the prototype network need to be considered as a whole for performing joint training to reduce a quantity of training times and therefore reduce a calculation amount.

In an embodiment, if the margin value between every two of the classes of the images in the second set is obtained by using the preset neural network, joint training is performed on the prototype network and the preset neural network by using the adjusted objective loss function.

In an embodiment, if the margin value between every two of the classes of the images is obtained by using the preset neural network, in a process of training the prototype network, the preset neural network and the prototype network need to be considered as a whole for performing joint training to reduce a quantity of training times and therefore reduce a calculation amount.

In an embodiment, after training the prototype network by using the objective function, the training device may further output the trained prototype network to an execution device (for example, a target device such as a terminal device or an edge device).

In an embodiment, the prototype network trained by the training device may be sent to the execution device, and the execution device applies the trained prototype network. In this way, a training process and an application process of the prototype network are separated, thereby reducing a calculation amount on the execution device side, and saving computing power of the execution device.

In an embodiment, a related device (for example, the execution device or the training device) may perform feature extraction on a target image by using the trained prototype network, to obtain a target feature point in the feature space. Then a specific image is determined through calculation, where a position of the target feature point in the feature space is closest to a class center of a class of the image. In this case, it is considered that the target image belongs to the class of the image, and further, a predicted class of the target image is output. The predicted class is a class, of an image, that corresponds to a prototype closest to the target feature point.

In the foregoing embodiment of this disclosure, specific application of the trained prototype network is described.

A second aspect of embodiments of this disclosure further provides an image classification system. The system may include a first network model, a measurement module, a second network model, and an objective loss function. The first network model includes a prototype network, configured to perform feature extraction on images in a training set, to obtain feature points, in a feature space, of the images in the training set, where the training set includes a first set and a second set, classes of images in the first set correspond to classes of images in the second set, and the feature points include first feature points corresponding to the images in the first set and second feature points corresponding to the images in the second set. The measurement module is configured to calculate, based on the first feature points, a prototype corresponding to a class of each image, where the prototype is used for indicating a class center of a position, in the feature space, of a first feature point corresponding to a class of each image. The second network model is configured to obtain a semantic similarity between the classes of the images in the second set, and obtain a margin value between the classes of the images in the second set based on the semantic similarity, where the margin value is used for adjusting the objective loss function. The objective loss function is configured to: after being adjusted, train the prototype network based on the first feature points and the second feature points.

In an embodiment, the second network model may further include a semantic feature extraction module, a semantic similarity calculation module, and a margin value calculation module. The semantic feature extraction module is configured to extract semantic vectors corresponding to the classes of the images in the second set, where one class of an image corresponds to one semantic vector. The semantic similarity calculation module is configured to perform calculation on the semantic vectors corresponding to the classes of the images in the second set, to obtain the semantic similarity between the classes of the images in the second set. The margin value calculation module is configured to perform calculation on the semantic similarity between the classes of the images in the second set, to obtain the margin value between the classes of the images in the second set.

In an embodiment, the semantic similarity calculation module is configured to: calculate a Euclidean distance between a first semantic vector and a second semantic vector in the semantic vectors, and determine a semantic similarity between a class of a first image and a class of a second image in the classes of the images based on the Euclidean distance, where the class of the first image corresponds to the first semantic vector, and the class of the second image corresponds to the second semantic vector; or perform an inner product operation on the first semantic vector and the second semantic vector to obtain an inner product operation result, and determine the semantic similarity between the class of the first image and the class of the second image based on the inner product operation result.

In an embodiment, the margin value calculation module may be an objective operation formula, and the objective operation formula is configured to perform a linear operation on the semantic similarity to obtain a margin value between every two of the classes of the images in the second set, where the objective operation formula includes at least one parameter variable.

In an embodiment, the objective loss function is configured to: after being adjusted, adjust a value of the at least one parameter variable based on the first feature points and the second feature points in a process of training the prototype network (namely, the first network model).

In an embodiment, specifically, the margin value calculation module may be alternatively a preset neural network, and the preset neural network is configured to perform an operation on the input semantic similarity, and output a margin value between every two of the classes of the images in the second set.

In an embodiment, the objective loss function is configured to: after being adjusted, perform joint training on the prototype network (namely, the first network model) and the preset neural network based on the first feature points and the second feature points.

In an embodiment, a network structure of the first network model is not limited. The first network model may be ResNet50, MobileNet, or Inception, provided that a function of the neural network is to perform feature extraction on a sample image to obtain a feature point in the feature space. A specific representation form of the first network model is not specifically limited herein.

In an embodiment, the semantic feature extraction module may be GloVe (Global Vectors for Word Representation) or word2vec. This is not specifically limited herein. Any functional module capable of implementing a unique correspondence from a label (for example, various types of words or phrases such as dogs, books, or shrubs) of a class of an image to a semantic vector may be considered as the semantic feature extraction module in embodiments of this disclosure.

A third aspect of embodiments of this disclosure further provides an image classification system. The system may include a first network model and a measurement module. The first network model includes a trained prototype network, and is configured to perform feature extraction on an obtained target image to obtain a target feature point in a feature space, where the trained prototype network may be the prototype network in any one of the second aspect or the possible embodiments of the second aspect of embodiments of this disclosure. The measurement module is configured to measure a position of the target feature point in the feature space, and output a predicted class of the target image, where the predicted class is a class of an image corresponding to a prototype closest to the target feature point.

A fourth aspect of embodiments of this disclosure provides a training device. The training device has a function of implementing the method in any one of the first aspect or the possible embodiments of the first aspect. The function may be implemented by hardware, or may be implemented by hardware executing corresponding software. The hardware or the software includes one or more modules corresponding to the function.

A fifth aspect of embodiments of this disclosure provides a training device. The training device may include a memory, a processor, and a bus system. The memory is configured to store a program. The processor is configured to invoke the program stored in the memory, to perform the method in any one of the first aspect or the possible embodiments of the first aspect of embodiments of this disclosure.

A sixth aspect of this disclosure provides a computer-readable storage medium. The computer-readable storage medium stores instructions. When the instructions are run on a computer, the computer is enabled to perform the method in any one of the first aspect or the possible embodiments of the first aspect.

A seventh aspect of embodiments of this disclosure provides a computer program. When the computer program is run on a computer, the computer is enabled to perform the method in any one of the first aspect or the possible embodiments of the first aspect.

BRIEF DESCRIPTION OF DRAWINGS

FIG. 8 shows a result of comparison between a trained neural network in actual application and other few-shot learning methods according to an embodiment of this disclosure;

FIG. 9 shows another result of comparison between a trained neural network in actual application and other few-shot learning methods according to an embodiment of this disclosure;

FIG. 14 is another schematic diagram of an application scenario according to an embodiment of this disclosure;

DESCRIPTION OF EMBODIMENTS

Figure 1:
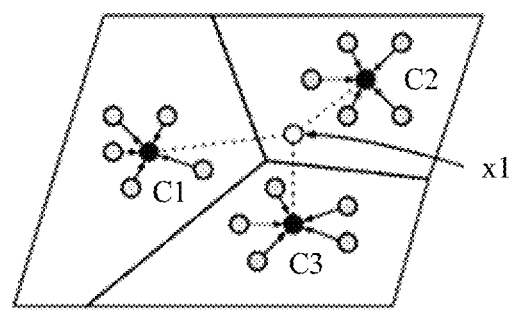
FIG. 1 is a schematic diagram of a position of a feature point obtained by projecting a sample to a feature space by using a prototype network.

Embodiments of this disclosure provide a neural network training method, an image classification system, and a related device, to introduce an adaptive margin value into a loss function of a prototype network, and add a larger margin value between similar classes and add a smaller margin value between less similar classes to adaptively adjust a margin between classes, so as to more easily distinguish between classes, where a margin value is determined based on a semantic similarity between classes.

In the specification, claims, and accompanying drawings of this disclosure, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Embodiments of this disclosure relate to a lot of knowledge about a neural network (a prototype network is also a neural network) and meta-learning. To better understand solutions in embodiments of this disclosure, the following first describes related terms and concepts, of a neural network and meta-learning, that may be included in embodiments of this disclosure.

(1) Neural Network

A neural network may include neural cells, and may be understood as a neural network having an input layer, a hidden layer, and an output layer. Usually, the first layer is the input layer, the last layer is the output layer, and intermediate layers are all hidden layers. A neural network having many hidden layers is referred to as a deep neural network (DNN). Work of each layer in the neural network may be described by using a mathematical expression: $\vec{y} = a(W \cdot \vec{x} + b)$. From a physical perspective, the work of each layer in the neural network may be understood as performing transformation from an input space to an output space (that is, from a row space of a matrix to a column space) through five operations on the input space (a set of input vectors). The five operations include: 1. dimensionality increase/dimensionality reduction; 2. scaling; 3. rotation; 4. translation; and 5. "shear mapping". The operations 1, 2, and 3 are performed by "$W \cdot \vec{x}$", the operation 4 is performed by "+b", and the operation 5 is performed by "a( )". The word "space" is used herein for expression because an object classified is not a single object but a type of object, and the space is a set of all individuals of the type of object, where W is a weight matrix of each layer of the neural network, and each value in the matrix represents a weight value of a neuron of the layer. The matrix W determines the foregoing spatial transformation from the input space to the output space, that is, W of each layer of the neural network controls how to transform a space. An objective of training a neural network is to finally obtain weight matrices of all layers of a trained neural network. Therefore, a neural network training process is essentially to learn a manner of controlling spatial transformation, more specifically, to learn a weight matrix.

(2) Loss Function

In a process of training a neural network, because output of the neural network is expected to be close, as much as possible, to a predicted value that is really expected, a predicted value of a current network may be compared with a really expected target value, and then a weight matrix of each layer of neural network is updated based on a difference between the two values (certainly, before the first update, there is usually an initialization process, to be specific, a parameter is preconfigured for each layer of the neural network). For example, if the predicted value of the network is large, the weight matrix is adjusted to make the predicted value smaller, and adjustment is continuously performed, until the neural network can obtain the really expected target value through prediction. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the neural network is a process of minimizing the loss as much as possible.

(3) Back Propagation Algorithm

In a process of training a neural network, an error back propagation (BP) algorithm may be used to correct a value of a parameter in an initial neural network model, so that a reconstruction error loss of the neural network model becomes increasingly small. Specifically, an input signal is transferred forward until an error loss occurs at an output, and the parameter in the initial neural network model is updated based on back propagation error loss information, to make the error loss converge. The back propagation algorithm is a back propagation motion dominated by an error loss, and is intended to obtain a parameter, for example, a weight matrix, of an optimal neural network model.

(4) Meta-Learning

Since development of machine learning, an increasing quantity of intelligent devices have also emerged. However, for an intelligent program, tens of thousands of or even millions of data records are required for training. Therefore, this is also a disadvantage of machine learning. Too much training data is required, but so much training data sometimes cannot be found for some training tasks. In this case, if a volume of training data is small, a neural network is subject to an overfitting phenomenon during training. This is not conducive to application. As a result, a few-shot learning problem occurs accordingly. To be specific, for a task with a few samples, a neural network capable of successfully performing desired training by using a small volume of data is required, to avoid an overfitting phenomenon while achieving a preset training effect.

Based on the foregoing problems, inspired by a fast learning ability of humans (to be specific, humans can recognize an object only based on descriptions of the object and based on previous experience and knowledge, with a few images or without images), people begin to think that a machine can learn quickly with a few samples if the machine can also have this learning ability of humans. This is meta-learning, which may also be referred to as learning to learn. The meta-learning is intended to "learn how to learn", to be specific, to use previous knowledge and experience to guide learning of a new task, thereby providing an ability of learning to learn.

Generally, few-shot classification may be implemented by using the meta-learning method in three manners: metric-based meta-learning, model-based meta-learning, and optimization-based meta-learning. This disclosure relates only to the metric-based meta-learning. Therefore, the following briefly describes the metric-based meta-learning. A metric is to express correlation between two samples in a specific manner. For example, in terms of a Euclidean distance (there are many measurement methods, and a cosine distance and a Euclidean distance are widely used), it can be considered that, in a specific projection space (which may also be referred to as a feature space, an embedding space, or the like), a shorter distance between samples indicates a higher similarity between the samples, that is, it is considered that the samples can be classified into one class. That is, the metric-based meta-learning is to learn a visual feature space with a class clustering structure to obtain an ability of generalization into a new class.

(5) Prototype Network

It can be learned from the foregoing metric-based meta-learning method that, two key points of metric-based learning are as follows: 1. How to project a sample to a feature space. 2. How to describe a position of a class in a feature space so as to calculate a distance between an unlabeled sample and each class. A prototype network emerges based on the two key points. The prototype network is a neural network that includes a parameter and that projects a sample to a feature space.

The following describes the prototype network with reference to the two key points of the metric-based meta-learning. First, the first key point is described: The prototype network may be represented by using a function $f_\theta(x)$. In this case, the function $f_\theta(x)$ may be understood as a process of projecting a sample to a feature space, where x indicates an eigenvector of the sample, a function value indicates a value obtained by projecting each sample to the feature space (which may also be referred to as a feature point, where one sample may be projected as one feature point in the feature space), and θ indicates a parameter of the prototype network. The parameter θ needs to be learned. It can be considered that the parameter θ determines a position, in the feature space, of a feature point corresponding to each sample. Therefore, essence of the first key point is how to make the prototype network $f_\theta(x)$ learn a desired value of the parameter θ so that feature points obtained by projecting samples of a same class to the feature space are close to each other. Then, the second key point is described: For example, training data of the prototype network is an image. Each group of training data is divided into a support set and a query set. The support set includes some samples whose classes are labeled. For example, there are classes of N images, and there are M samples in a class of each image. In this case, the support set is N-way-M-shot. The query set also includes some labeled samples. Classes of samples in the query set need to be the same as classes of samples in the support set. For example, the support set includes three classes: "cat", "sofa", and "dog". In this case, the classes of the samples in the query set also need to be the three classes: "cat", "sofa", and "dog". However, a quantity of samples in each class in the query set may not be limited, and does not need to be the same as a quantity of samples in each class in a sample set. In this case, the query set may be denoted as N-way-Q-shot, where Q and M may be the same or different. This is not limited herein. Each class is determined by a class center of positions of feature points obtained by projecting, to the feature space, all samples in the sample set that belong to the class (for example, an average value of positions of feature points obtained by projecting samples in a class of one image to the feature space may be used as a class center of the class). The class center is a prototype corresponding to each class. For ease of understanding, FIG. 1 is used as an example for illustration: The sample set is 3-way-5-shot. To be specific, the sample set has three classes (way), and each class has five samples (shot). x1 is a feature point obtained by projecting a sample in the query set to the feature space (this is merely an example, and other samples in the query set are not shown). C1, C2, and C3 are prototypes corresponding to three classes in the sample set, and five points around each prototype are five feature points obtained by projecting, to the feature space, five samples in the sample set that correspond to the class. C1 is used as an example. A position of C1 in the feature space is obtained by calculating an average value of positions of five feature points obtained by projecting, to the feature space, five samples corresponding to the class. That is, in the feature space, there are samples of three classes, and samples of a same class are close to each other. To label the sample x1, the sample x1 is projected to the space, and a specific class whose prototype is closer to x1 is determined through calculation. In this case, it is considered that x1 belongs to the class. Because a class of the sample x1 is actually known in a training process (a class of each sample in the query set is known), a predicted class of the sample x1 is compared with the class to which the sample x1 really belongs, and a minimum value of a loss function of the prototype network $f_\theta(x)$ is obtained by using a random gradient descent method, so that a desired value of θ is obtained through convergence. Therefore, it can be considered that the prototype network $f_\theta(x)$ can project samples of a same class to regions close to each other after the training is completed. In actual application, for a really unlabeled sample y of an unknown class, the sample y may be projected to the feature space by using the prototype network, and a specific class whose prototype is closest to the sample y is determined through calculation. For example, it is assumed that the sample y is closest to the prototype C1. In this case, it is considered that the class of the sample y is a class corresponding to C1.

However, in actual application, the foregoing prototype network has a problem when processing samples of similar classes. If there is a sample, where distances between a feature point obtained by projecting the sample to the feature space by using the prototype network and prototypes of two classes are almost the same or even difficult to distinguish, for example, in FIG. 1, a distance between x1 and C2 is basically the same as a distance between x1 and C3, it is difficult for the prototype network to classify the sample (x1). This greatly limits accuracy of classifying a sample by the prototype network.

Based on this, to resolve the foregoing problem, an embodiment of this disclosure first provides a neural network training method, to introduce an adaptive margin value into a loss function of a prototype network, and add a larger margin value between similar classes and add a smaller margin value between less similar classes to adaptively adjust a margin between classes, so as to more easily distinguish between classes, where a margin value is determined based on a semantic similarity between classes.

The following describes embodiments of this disclosure with reference to the accompanying drawings. A person of ordinary skill in the art can know that, with development of technologies and emergence of new scenarios, technical solutions provided in embodiments of this disclosure are also applicable to similar technical problems.

Figure 2:
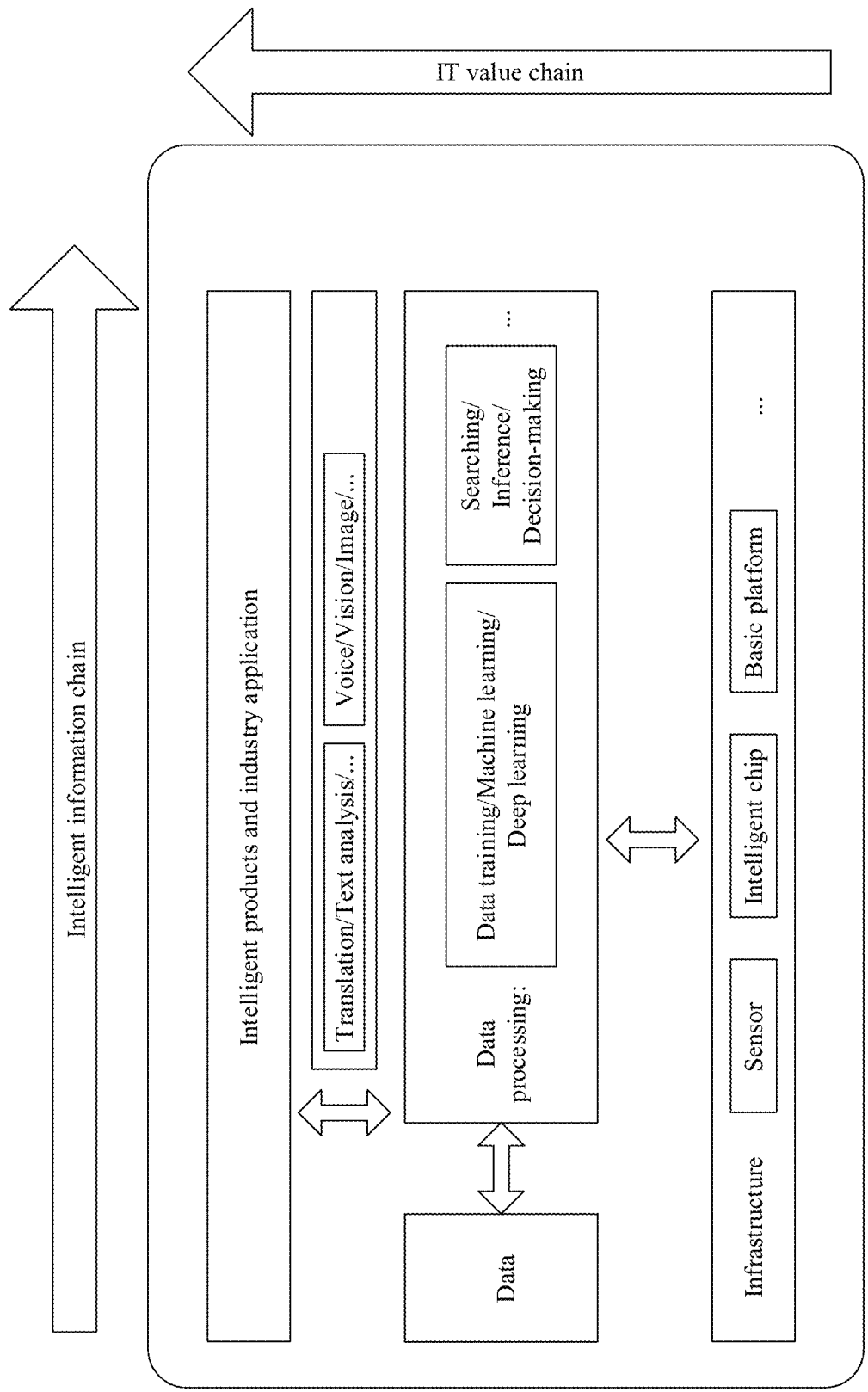
FIG. 2 is a schematic diagram of a structure of a main artificial intelligence framework according to an embodiment of this disclosure.

First, an overall working process of an artificial intelligence system is described. FIG. 2 is a schematic diagram of a structure of a main artificial intelligence framework. The following describes the main artificial intelligence framework from two dimensions: "intelligent information chain" (a horizontal axis) and "IT value chain" (a vertical axis). The "intelligent information chain" reflects a process from data obtaining to data processing. For example, the "intelligent information chain" may be a general process of intelligent information perception, intelligent information representation and formation, intelligent inference, intelligent decision-making, and intelligent execution and output. In this process, data undergoes a refining process of "data—information— knowledge—intelligence". The "IT value chain" is an industrial ecological process from underlying infrastructure of artificial intelligence to information (providing and processing technical implementations) to a system, and reflects value brought by artificial intelligence to the information technology industry.

(1) Infrastructure

Infrastructure provides computing capability support for the artificial intelligence system, to communicate with the outside world and implement support by using a basic platform.

Communication with the outside is performed by using a sensor. A computing capability is provided by an intelligent chip (a hardware acceleration chip, for example, a CPU, an NPU, a GPU, an ASIC, or an FPGA). The basic platform includes related platform assurance and support such as a distributed computing framework and a network, and may include cloud storage and computing, interconnection and interworking networks, and the like. For example, the sensor communicates with the outside to obtain data, and the data is provided for an intelligent chip in a distributed computing system provided by the basic platform to perform calculation.

(2) Data

Data at an upper layer of the infrastructure is used to indicate a data source in the artificial intelligence field. The data relates to graphics, images, speech, and text, and further relates to internet of things data of conventional devices, and includes service data of a conventional system and perception data such as force, displacement, liquid level, temperature, and humidity.

(3) Data Processing

Data processing usually includes data training, machine learning, deep learning, searching, inference, decision-making, and other methods.

The machine learning and the deep learning may be used for performing symbolic and formal intelligent information modeling, extraction, preprocessing, training, and the like on data.

The inference is a process of performing machine thinking and solving problems by simulating an intelligent inference mode of humans in a computer or intelligent system by using formal information and based on an inference control policy. Typical functions are searching and matching.

The decision-making is a process of performing decision-making after performing inference on intelligent information, and usually provides classification, sorting, prediction, and other functions.

(4) General Capabilities

After data undergoes the foregoing data processing, some general capabilities may be further formed based on a data processing result. For example, the general capabilities may be an algorithm or a general system, for example, translation, text analysis, computer vision processing, speech recognition, and image recognition.

(5) Intelligent Products and Industry Application

Intelligent products and industry application are products and application of the artificial intelligence system in various fields, are obtained by encapsulating an overall artificial intelligence solution, and implement productization and practical application of information decision-making. Application fields of the artificial intelligence system include intelligent terminals, intelligent manufacturing, intelligent transportation, smart home, intelligent healthcare, intelligent security protection, automated driving, safe city, and the like.

Embodiments of this disclosure may be applied to an optimization design of a loss function of a prototype network, and a prototype network whose loss function is optimized by using this application may be applied to subdivision fields of the artificial intelligence field, for example, the image processing field and the computer vision field. In an embodiment, with reference to FIG. 2, in this embodiment of this disclosure, data in a dataset obtained by the infrastructure may be a plurality of pieces of different types of data (which may also be referred to as training data, where the training data constitutes a training set, the training set may include a plurality of groups of training data, and one group of training data constitutes one meta-task) obtained by using sensors such as a camera and a radar; or may be a plurality of pieces of image data or a plurality of pieces of video data, provided that the training set meets a function of training a prototype network. A type of data in the training set is not specifically limited herein.

Figure 3:
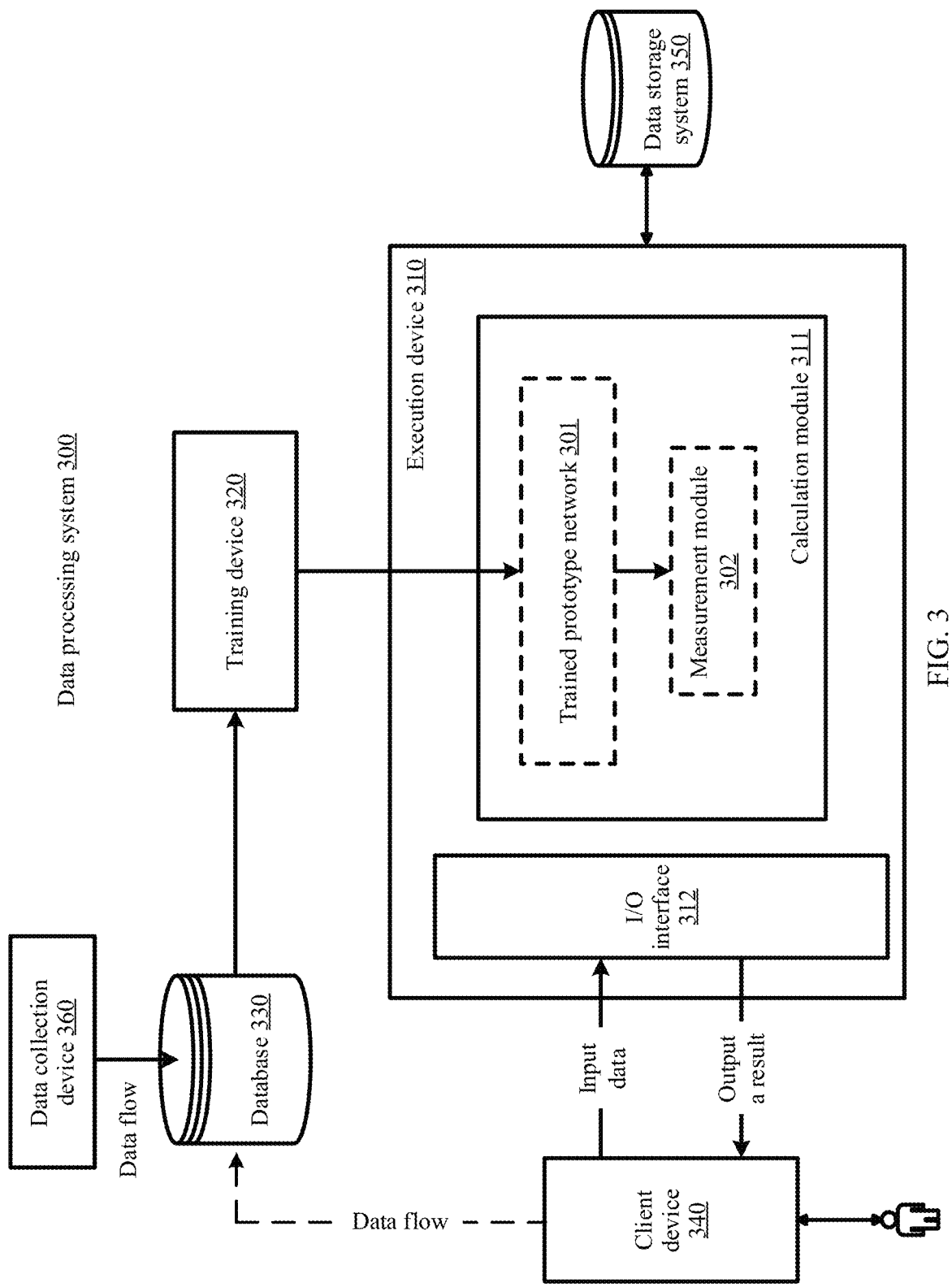
FIG. 3 is a diagram of a system architecture of a data processing system according to an embodiment of this disclosure.

FIG. 3 is a diagram of a system architecture of a data processing system according to an embodiment of this disclosure. In FIG. 3, the data processing system 300 includes an execution device 310, a training device 320, a database 330, a client device 340, a data storage system 350, and a data collection device 360. The execution device 310 includes a calculation module 311. The calculation module 311 includes a trained prototype network 301 obtained by applying embodiments of this disclosure. The prototype network 301 is configured to perform feature extraction on a sample image to obtain a feature point in a feature space.

The data collection device 360 is configured to obtain an open-source massive dataset (namely, a training set) required by a user, and store the training set to the database 330. The training device 320 trains a prototype network 301 in the calculation module 311 based on the training set maintained in the database 330. The execution device 310 may invoke data, code, and the like in the data storage system 350, and may also store data, instructions, and the like to the data storage system 350. The data storage system 350 may be configured on the execution device 310, or the data storage system 350 may be an external memory relative to the execution device 310.

The prototype network 301 trained by the training device 320 may be applied to different systems or devices (namely, the execution device 310), for example, a mobile phone, a tablet computer, a notebook computer, a monitoring system, or a security system. In FIG. 3, the execution device 310 is equipped with an I/O interface 312 for exchanging data with an external device, and a "user" may input data to the I/O interface 312 by using the client device 340. For example, the client device 340 may be a camera device of a surveillance system. A target image captured by the camera device is input to the calculation module 311 of the execution device 310 as input data. The calculation module 311 detects the input target image to obtain a detection result, and then outputs the detection result to the camera device or directly displays the detection result on a display screen (if any) of the execution device 310. In addition, in some embodiments of this disclosure, the client device 340 may be alternatively integrated into the execution device 310. For example, when the execution device 310 is a mobile phone, a target image may be directly captured by using a camera of the mobile phone, or a target image sent by another device (for example, another mobile phone) is received, and then the calculation module 311 in the mobile phone obtains a detection result by detecting the target image, and directly displays the detection result on a display screen of the mobile phone. Product forms of the execution device 310 and the client device 340 are not limited herein.

It should be noted that, in this embodiment of this disclosure, in addition to the prototype network 301 generated through training by the training device 320, the calculation module 311 may further include a measurement module 302. The measurement module 302 is configured to measure a position of a feature point corresponding to a sample in the feature space. In an embodiment, in a training process, the measurement module 302 may be configured to calculate, based on first feature points, a prototype corresponding to a class of each image, where the prototype is used for indicating a class center of a position, in the feature space, of a first feature point corresponding to a class of each image (for example, an average value of positions of feature points obtained by projecting samples in one class to the feature space may be used as a class center of the class). In an actual application process, the measurement module 302 may be further configured to measure a position of a target feature point (namely, a feature point corresponding to the input target image) in the feature space, and output a predicted class of the target image. The predicted class is a class, of an image, that corresponds to a prototype closest to the target feature point.

It should be noted that FIG. 3 is merely a schematic diagram of a system architecture according to an embodiment of this disclosure. A position relationship between the devices, the components, the modules, and the like shown in the figure does not constitute any limitation. For example, in FIG. 3, the data storage system 350 is an external memory relative to the execution device 310, or in another case, the data storage system 350 may be configured on the execution device 310. In FIG. 3, the client device 340 is an external device relative to the execution device 310, or in another case, the client device 340 may be integrated in the execution device 310.

It should be further noted that, in some embodiments of this disclosure, the calculation module 311 may be further split into a plurality of submodules/subunits to jointly implement solutions provided in embodiments of this disclosure. This is not specifically limited herein.

Figure 4:
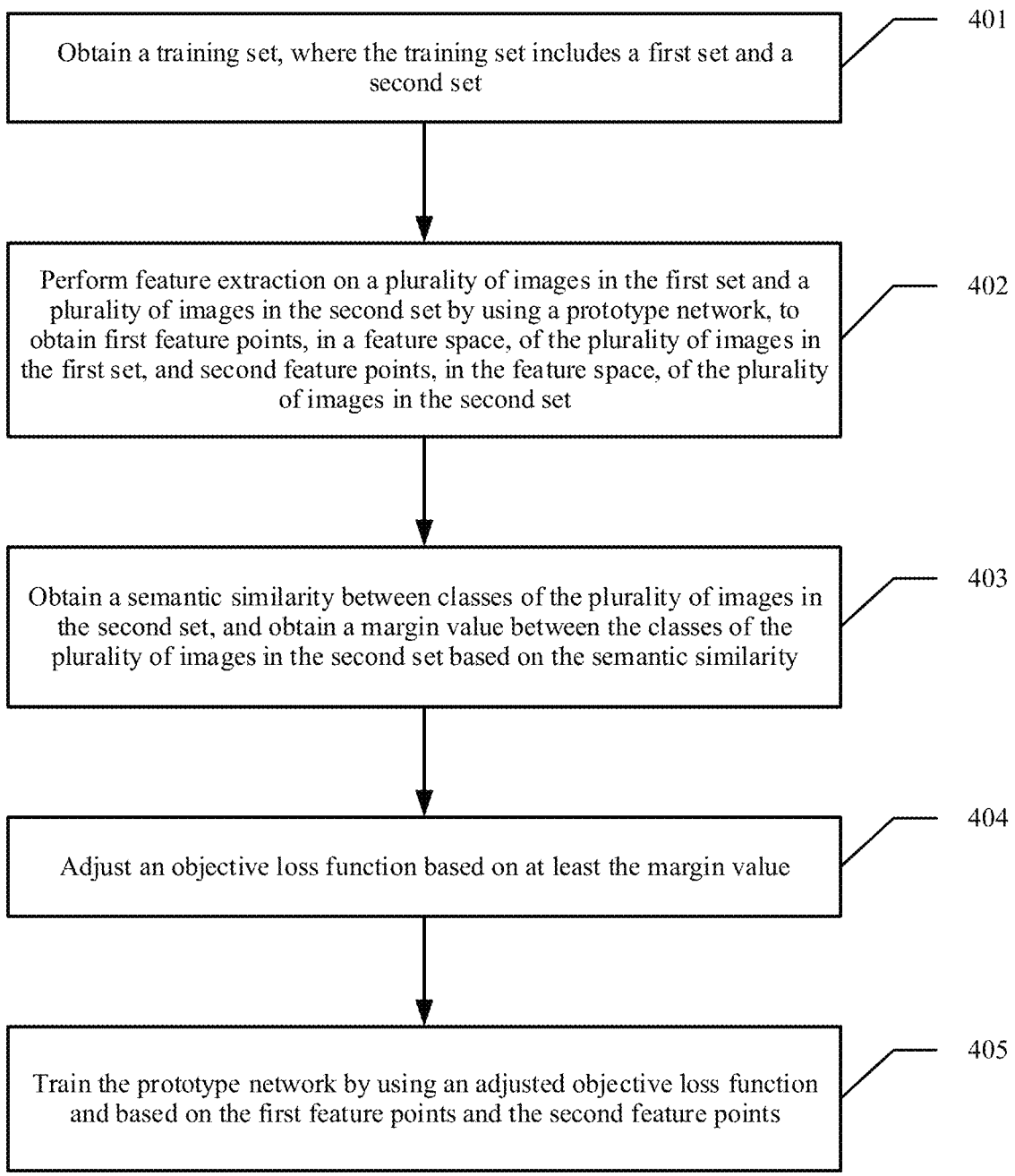
FIG. 4 is a schematic diagram of a neural network training method according to an embodiment of this disclosure.

With reference to the foregoing descriptions, the following describes a neural network training method provided in embodiments of this disclosure. FIG. 4 shows a neural network training method according to an embodiment of this disclosure. The method includes the following operations.

In operation 401, a training set is obtained, where the training set includes a first set and a second set.

First, a training device obtains a training set, where the training set may include a plurality of groups of training data (each group of training data may be referred to as a meta-task), and the training set may include a first set (which may also be referred to as a support set) and a second set (which may also be referred to as a query set). For example, a group of training data may be divided into a first set and a second set, and if the training set includes a plurality of groups of training data, each group of training data may be divided into a first set and a second set. Classes of images in the first set correspond to classes of images in the second set. For example, the classes of the images in the first set are three classes: "dog", "sofa", and "table". In this case, the classes of the images in the second set are also the three classes: "dog", "sofa", and "table". A quantity of images in a class of each image is not limited.

In operation 402, feature extraction is performed on a plurality of images in the first set and a plurality of images in the second set by using a prototype network, to obtain first feature points, in a feature space, of the plurality of images in the first set, and second feature points, in the feature space, of the plurality of images in the second set.

Then the training device performs feature extraction on images in each group of training data by using the prototype network based on the plurality of groups of training data in the training set, to obtain feature points of images in each group of training data in the feature space. A point in the feature space (namely, a feature point) is obtained by performing feature extraction on each image in the training set by using the prototype network. The obtained feature points include first feature points corresponding to the images in the first set and second feature points corresponding to the images in the second set. Herein, it should be noted that the first feature points obtained through extraction are used for calculating a prototype corresponding to a class of each image. The prototype is used for indicating a class center of a position, in the feature space, of a first feature point corresponding to a class of each image. For details, refer to the description content corresponding to FIG. 1. Details are not described herein again. It should be noted that the class center may have a plurality of representation forms. For example, an average value of positions of feature points obtained by projecting images in a class of one image to the feature space may be used as a class center of the class of the image; or a squared average value of positions of feature points obtained by projecting images in a class of one image to the feature space may be used as a class center of the class of the image. A specific representation form of a class center of a class of an image is not specifically limited herein.

In operation 403, a semantic similarity between classes of the plurality of images in the second set is obtained, and a margin value between the classes of the plurality of images in the second set is obtained based on the semantic similarity.

The training device further obtains the semantic similarity between the classes of the plurality of images in the second set. Because the classes of the images in the first set correspond to the classes of the images in the second set, in some embodiments of this disclosure, the semantic similarity between the classes of the plurality of images in the first set may be alternatively obtained. This is not specifically limited herein.

It should be noted that, in some embodiments of this disclosure, obtaining a semantic similarity between classes of a plurality of images may include but is not limited to the following manners.

A: Calculate a Euclidean Distance Between Every Two of Semantic Vectors Corresponding to Images.

First, semantic vectors corresponding to classes of the images are extracted by using a semantic feature extraction module, where one class of an image corresponds to one semantic vector. Then a Euclidean distance between every two of the semantic vectors is calculated. A first semantic vector and a second semantic vector in the semantic vectors are used as examples. It is assumed that the first semantic vector and the second semantic vector are obtained by using the semantic feature extraction module based on a class of a first image and a class of a second image respectively. In this case, after a Euclidean distance between the first semantic vector and the second semantic vector is calculated, a semantic similarity between the class of the first image and the class of the second image may be determined based on the Euclidean distance. Usually, a Euclidean distance and a semantic similarity are in a negative correlation relationship. To be specific, a larger calculated Euclidean distance between two semantic vectors indicates a higher dissimilarity (that is, a lower semantic similarity) between classes, of images, that respectively correspond to the two semantic vectors, for example, a semantic similarity between "dog" and "sofa" is low; on the contrary, a smaller calculated Euclidean distance between two semantic vectors indicates a higher similarity (that is, a higher semantic similarity) between classes, of images, that respectively correspond to the two semantic vectors, for example, a semantic similarity between "dog" and "wolf" is high.

It should be noted that, in some embodiments of this disclosure, the semantic feature extraction module may be GloVe or word2vec. This is not specifically limited herein. Any functional module capable of implementing a unique correspondence from a label (for example, various types of words or phrases such as dogs, books, or shrubs) of a class of an image to a semantic vector may be considered as the semantic feature extraction module in this embodiment of this disclosure.

B: Perform an Inner Product Operation Between Every Two of the Semantic Vectors Corresponding to the Images to Obtain an Inner Product Operation Result.

Similarly, first, semantic vectors corresponding to classes of the images are extracted by using a semantic feature extraction module, where one class of an image corresponds to one semantic vector. Then an inner product operation is performed between every two of the semantic vectors to obtain an inner product operation result. A first semantic vector and a second semantic vector in the semantic vectors are still used as examples for description. It is assumed that the first semantic vector and the second semantic vector are obtained by using the semantic feature extraction module based on a class of a first image and a class of a second image respectively. In this case, an inner product (which may also be referred to as a scalar product or a dot product) operation may be performed on the first semantic vector and the second semantic vector, that is, dot multiplication is performed on the first semantic vector and the second semantic vector, to obtain a dot multiplication result (namely, an inner product operation result). Then a semantic similarity between the class of the first image and the class of the second image may be determined based on the inner product operation result. Usually, an inner product operation result and a semantic similarity are in a positive correlation relationship. To be specific, a calculated inner product operation result between two semantic vectors being closer to 1 (assuming that the inner product operation result has been normalized) indicates a higher similarity (that is, a higher semantic similarity) between classes, of images, that respectively correspond to the two semantic vectors, for example, a semantic similarity between "dog" and "wolf" is high; on the contrary, a calculated inner product operation result between two semantic vectors being closer to 0 indicates a higher dissimilarity (that is, a lower semantic similarity) between classes, of images, that respectively correspond to the two semantic vectors, for example, a semantic similarity between "dog" and "sofa" is low.

After a semantic similarity between every two of the classes of the images is obtained, a margin value between every two of the classes of the images in the second set may be obtained based on the semantic similarity. Specifically, obtaining the margin value between every two of the classes of the images in the second set includes but is not limited to the following manners.

A: Perform a Linear Operation on the Semantic Similarity by Using an Objective Operation Formula to Obtain the Margin Value Between Every Two of the Classes of the Images in the Second Set.

In this manner, the objective operation formula includes at least one parameter variable, and a value of the at least one parameter variable needs to be determined by learning the images in the second set.

In some embodiments of this disclosure, the objective operation formula may be expressed by using the following formula (1):

$$m_{y,k}=M(e_y,e_k)=\alpha \cdot sim(e_y,e_k)+\beta \qquad (1), \text{where}$$

$m_{y,k}$ is a margin value between a class y of an image (a class, of an image, to which a sample x in the second set belongs) and any class k of an image in remaining classes of images other than y, $e_y$ is a semantic vector corresponding to the class y of an image (the class y of an image is a class, of an image, to which the sample x in the second set belongs), $e_k$ is a semantic vector of any class of an image in remaining classes of images other than y, sim( ) is a semantic similarity operation performed based on the semantic vectors, and $\alpha$ and $\beta$ are parameters that need to be learned.

B: Input the Semantic Similarity to a Preset Neural Network to Obtain the Output Margin Value Between Every Two of the Classes of the Images in the Second Set.

In this manner, the semantic similarity is used as input of the preset neural network to obtain an output result, where the output result is the margin value between every two of the classes of the images in the second set.

In some embodiments of this disclosure, the preset neural network may be expressed by using the following formula (2):

$$\{m_{y,k}\}_{k \in C_t \setminus \{y\}}=G(\{sim(e_y,e_k)\}_{k \in C_t \setminus \{y\}}) \qquad (2), \text{where}$$

$C_t$ is a type of an overall class of images in a group of training data (namely, a meta-task) in the training set, $m_{y,k}$ is a margin value between a class y of an image (a class, of an image, to which a sample x in the second set belongs) and any class k of an image in remaining classes of images other than y, $e_y$ is a semantic vector corresponding to the class y of an image (the class y of an image is a class, of an image, to which the sample x in the second set belongs), $e_k$ is a semantic vector of any class of an image in remaining classes of images other than y, sim( ) is a semantic similarity operation performed based on the semantic vectors, $k \in C_t \setminus \{y\}$ is any class of an image in remaining classes of images other than the classy of an image in $C_t$, and G( ) is the preset neural network, which may be referred to as a neural network G herein. The neural network G also needs to be learned. In an embodiment, the neural network G is trained by using the images in the second set, so that the neural network G can output a desired margin value between every two of the classes of the images in the second set.

Figure 5:
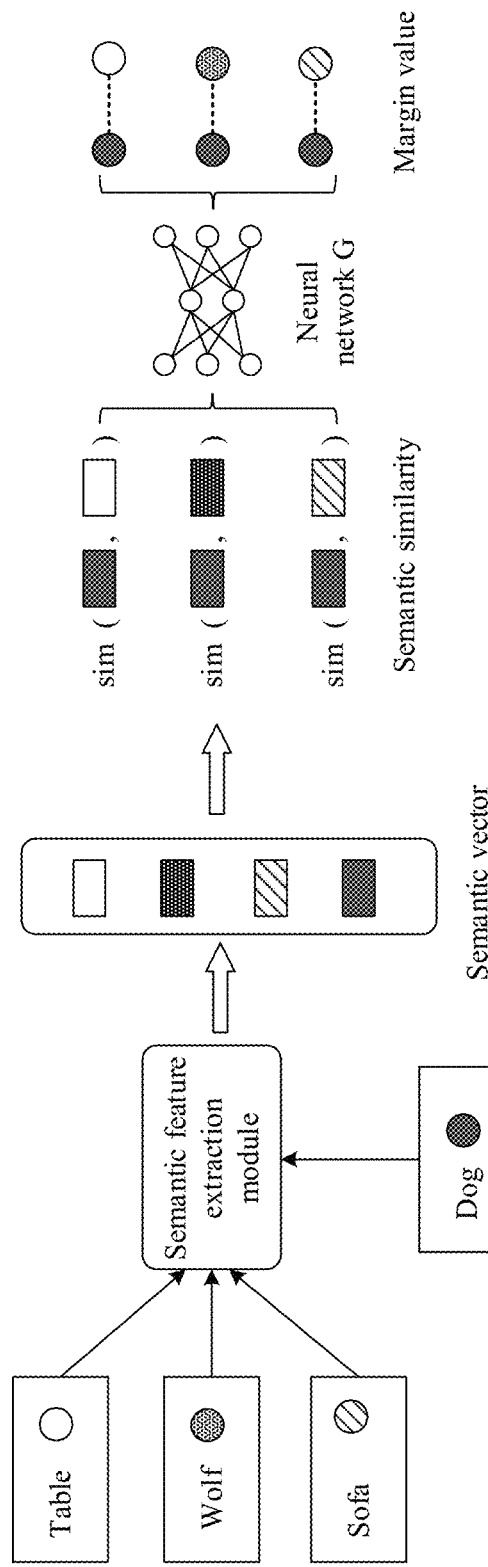
FIG. 5 is a schematic diagram of finally obtaining a margin value between classes of images based on labels according to an embodiment of this disclosure.

For ease of understanding, FIG. 5 is used as an example below to describe how to obtain a semantic vector between classes of images based on labels of the classes of the images, and how to obtain a semantic similarity based on a semantic vector and finally obtain a margin value between classes of images. In FIG. 5, it is assumed that classes of images in the first set and the second set are four classes, namely, "table", "wolf", "sofa", and "dog", and "dog" is a label of a sample x in the second set. In this case, first, labels of the four classes of images, namely, "table", "wolf", "sofa", and "dog", are input to a semantic feature extraction module (for example, GloVe or word2vec), and a semantic vector corresponding to each class of an image is output. Then calculation is performed on semantic vectors corresponding to the classes of the images in the second set to obtain the semantic similarity between every two of the classes of the images. The sample x is used as an example. It is known that a class, of an image, to which the sample x belongs is "dog". Therefore, in this case, a semantic similarity between a semantic vector of "dog" and each of semantic vectors of "table", "wolf", and "sofa" may be calculated. For details about how to calculate a semantic similarity between classes of images based on a semantic vector, refer to the foregoing descriptions (for example, using a Euclidean distance between semantic vectors, or performing an inner product operation on semantic vectors). Details are not described herein again. After the semantic similarity between "dog" and each of "table", "wolf", and "sofa" is obtained, the semantic similarity between "dog" and each of "table", "wolf", and "sofa" may be input to the neural network G, where the neural network G is described above, and details are not described herein again. Then the neural network G outputs a margin value between "dog" and each of "table", "wolf", and "sofa".

It should be noted that FIG. 5 shows the neural network G, and in some embodiments of this disclosure, the semantic similarity between "dog" and each of "table", "wolf", and "sofa" may be alternatively used as an independent variable of the objective operation formula. A processing manner is similar, and details are not described herein again.

In operation 404, an objective loss function is adjusted based on at least the margin value.

After obtaining the margin value between every two of the classes of the images in the second set, the training device may adjust a loss function of the prototype network based on at least the margin value, where the loss function of the prototype network may be referred to as an objective loss function.

Specifically, in some embodiments of this disclosure, the objective loss function may be expressed by using the following formula (3):

$$L = -\frac{1}{|Q|} \sum_{(x,y) \in Q} \log \frac{e^{s_y(x)}}{e^{s_y(x)} + \sum_k e^{s_k(X) + m_{y,k}}}, \quad (3)$$

where
L is the objective loss function of the prototype network, Q is a size of the second set (that is, the images included in the second set), x is a sample (namely, the sample x) in the second set, y is a class, of an image, to which the sample x belongs, k is any class of an image in remaining classes of images other than the class y of an image, and $m_{y,k}$ is a margin value between the class y of an image (a class, of an image, to which the sample x in the second set belongs) and any class k of an image in remaining classes of images other than y.

It should be noted that, in the formula (3), for any sample x in the second set, $s_y(x)$ corresponding to the sample x needs to be calculated first, so that the loss function L can be obtained. In some embodiments of this disclosure, obtaining $s_y(x)$ may include but is not limited to the following manners. Manner 1: $s_y(x) = w_y^T F(x)$, where F( ) is the prototype network, and $w_y$ is a weight of a classifier in the prototype network. Manner 2: $s_y(x) = D(F(x), r_y)$, where $r_y$ is a class center of the class y of an image in the feature space, D( ) is a similarity function, and D( ) is used to indicate that two vectors being closer to each other indicates a higher similarity, and specifically, in this embodiment of this disclosure, may indicate a similarity between a feature point, in the feature space, of any sample x in the second set and the class center of the class y of an image. It can be considered that the sample x being closer to the class center of the class y of an image indicates a higher similarity between the sample x and the class y of an image. In a training process, the sample x is used as a test sample to obtain a prediction result, and finally, whether the prediction result is accurate is verified based on a class to which the sample x really belongs, so as to adjust a network parameter of the prototype network.

In operation 405, the prototype network is trained using an adjusted objective loss function and based on the first feature points and the second feature points.

After adjusting the objective loss function based on at least the margin value, the training device may train the prototype network based on the first feature points and the second feature points, in the feature space, of the first set and the second set in each group of training data and by using the adjusted objective loss function. Usually, the network parameter of the prototype network is updated by minimizing the objective loss function.

It should be noted that, in some embodiments of this disclosure, a network structure of the prototype network is not limited. The prototype network may be ResNet50, MobileNet, Inception, or another suitable network capable of extracting an image feature, provided that a function of the neural network is to perform feature extraction on a sample image to obtain a feature point in the feature space. A specific representation form of the prototype network is not specifically limited herein.

It should be further noted that, in some embodiments of this disclosure, the prototype network is trained based on the first feature points and the second feature points by using the adjusted objective loss function, and there may be a plurality of manners of determining a degree of training. The following provides some termination conditions for stopping training the prototype network, including but not limited to:

(1) The adjusted objective loss function reaches a preset threshold.

After the objective loss function is configured, a threshold (for example, 0.03) may be preset for the adjusted objective loss function. In a process of performing iterative training on the prototype network, after each round of training is completed, whether a value of an objective loss function obtained through the current round of training reaches the threshold is determined. If the objective loss function does not reach the preset threshold, the training continues; or if the objective loss function reaches the preset threshold, the training is terminated. In this case, a value of a network parameter of a prototype network determined in the current round of training is used as a value of a network parameter of a finally trained prototype network.

(2) The adjusted objective loss function starts to converge.

After the objective loss function is configured, iterative training may be performed on the prototype network. If a difference between a value of an objective loss function obtained through a current round of training and a value of an objective loss function obtained through a previous round of training falls within a preset range (for example, 0.01), it is considered that the adjusted objective loss function converges, and the training may be terminated. In this case, a value of a network parameter of a prototype network determined in the current round of training is used as a value of a network parameter of a finally trained prototype network.

(3) training reaches a preset quantity of times.

In this manner, a quantity of iterations (for example, 1000) of training on the prototype network may be preconfigured. After the objective loss function is configured, iterative training may be performed on the prototype network. After each round of training is completed, a value of a network parameter of a prototype network corresponding to the current round is stored until a quantity of iterations of training reaches the preset quantity of iterations. Then a prototype network obtained through each round of training is verified by using test data, and a value of a network parameter with best performance is selected as a value of a final network parameter of the prototype network.

In the foregoing embodiment of this disclosure, first, feature extraction is performed on images in the training set (including the first set and the second set) by using the prototype network, to obtain a feature point, in the feature space, that corresponds to each image in the training set (including the first feature points corresponding to the images in the first set and the second feature points corresponding to the images in the second set). The first feature points are used for calculating a prototype of each class (the prototype is used for indicating a class center of a position, in the feature space, of a first feature point corresponding to a class of each image). The second feature points are used for updating a network parameter of the prototype network (the network parameter determines a position of a feature point obtained by projecting an image to the feature space). That is, the network parameter of the prototype network needs to be learned by using the second feature points. If a value of a learned network parameter is desired, a distance between feature points, in the feature space, of images of a same class is short. Based on this, a desired objective loss function needs to be constructed. In this embodiment of this disclosure, first, the semantic similarity between every two of the classes of the images in the second set is obtained, and the margin value between every two of the classes of the images in the second set is obtained based on the semantic similarity. If semantic similarities between every two of classes of images are different, margin values between every two of the classes of the images are also different. Finally, the objective loss function is adjusted based on at least the margin value. After the objective loss function is adjusted, the images in the training set are trained by using the prototype network, so that a final objective function reaches a preset value. In this embodiment of this disclosure, the adaptive margin value is introduced into the loss function of the prototype network. To be specific, a larger margin value is added between similar classes, and a smaller margin value is added between less similar classes, to adaptively adjust a margin between classes, so as to more easily distinguish between classes, thereby improving classification accuracy of the prototype network.

It should be noted that, in some embodiments of this disclosure, the margin value between every two of the classes of the images in the second set may be obtained by using the neural network G or the objective operation formula, and regardless of which method is used for obtaining the margin value between every two of the classes of the images in the second set, there is a parameter that needs to be learned. If the margin value is obtained by using the neural network G, a network parameter of the neural network G needs to be learned to determine a value of the network parameter. If the margin value is obtained by using the objective operation formula, a parameter variable of the objective operation formula needs to be learned to determine a value of the parameter variable. Regardless of which method is used, joint training needs to be performed on the prototype network and the neural network G or the objective operation formula in a process of training the prototype network. In an embodiment, if the margin value between every two of the classes of the images in the second set is obtained by using the objective operation formula, in a process of training the prototype network by using the objective loss function, the value of the at least one parameter variable included in the objective operation formula is adjusted. Similarly, if the margin value between every two of the classes of the images in the second set is obtained by using the neural network G, joint training is performed on the prototype network and the neural network G by using the objective loss function.

It should be noted that, in some embodiments of this disclosure, after training the prototype network by using the objective function, the training device may further output the trained prototype network to an execution device (for example, a target device such as a terminal device or an edge device).

It should be further noted that, in some embodiments of this disclosure, the execution device may perform feature extraction on a target image by using the trained prototype network, to obtain a target feature point in the feature space.

Then a specific image is determined through calculation, where a position of the target feature point in the feature space is closest to a class center of a class of the image. In this case, it is considered that the target image belongs to the class of the image, and further, a predicted class of the target image is output. The predicted class is a class, of an image, that corresponds to a prototype closest to the target feature point.

Figure 6:
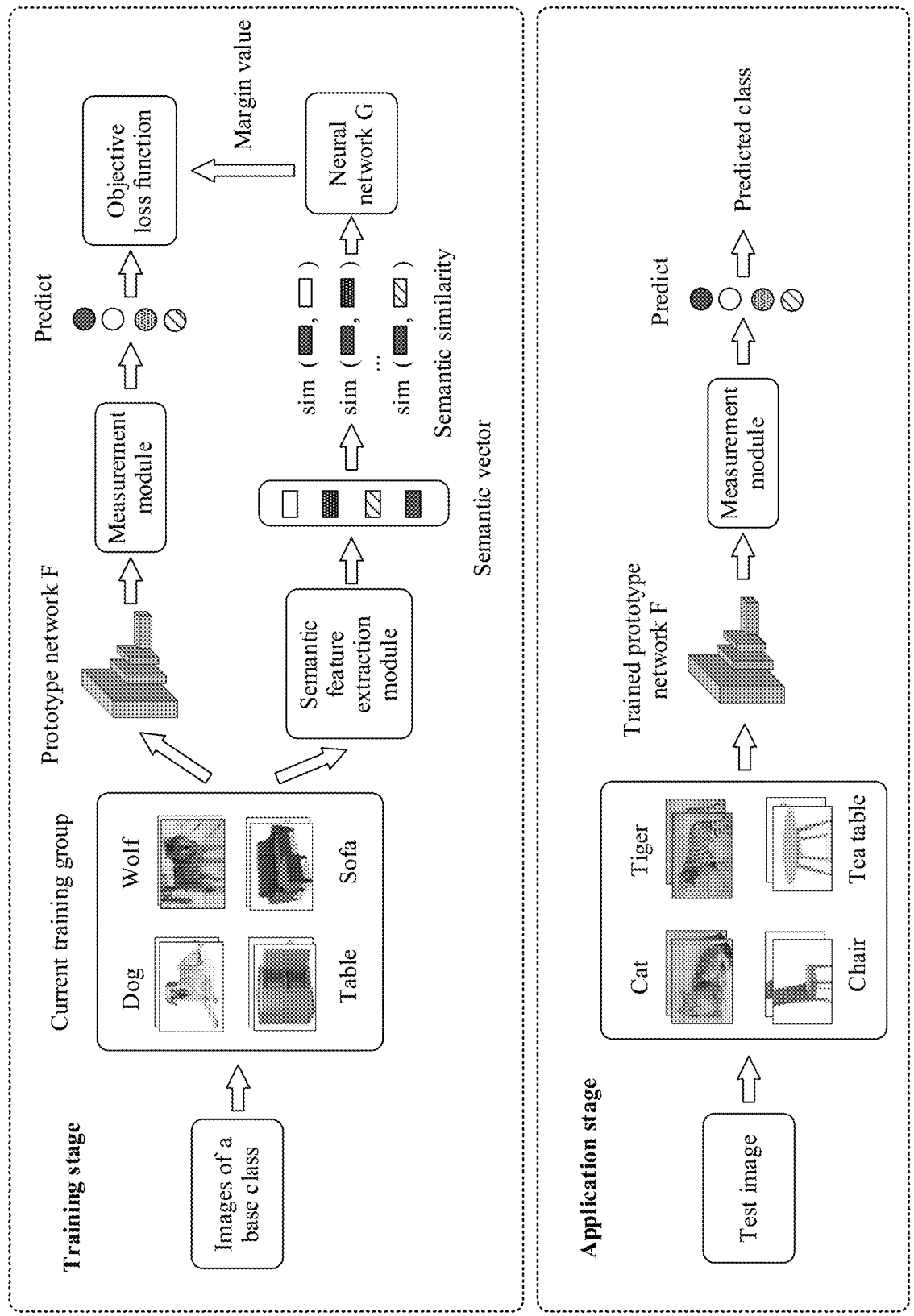
FIG. 6 is another schematic diagram of a neural network training method according to an embodiment of this disclosure.

For ease of understanding, the following describes an entire process of the foregoing embodiment by using FIG. 6 as an example. Herein, a training stage and an application stage are separately described.

(1) Training Stage

Figure 7:
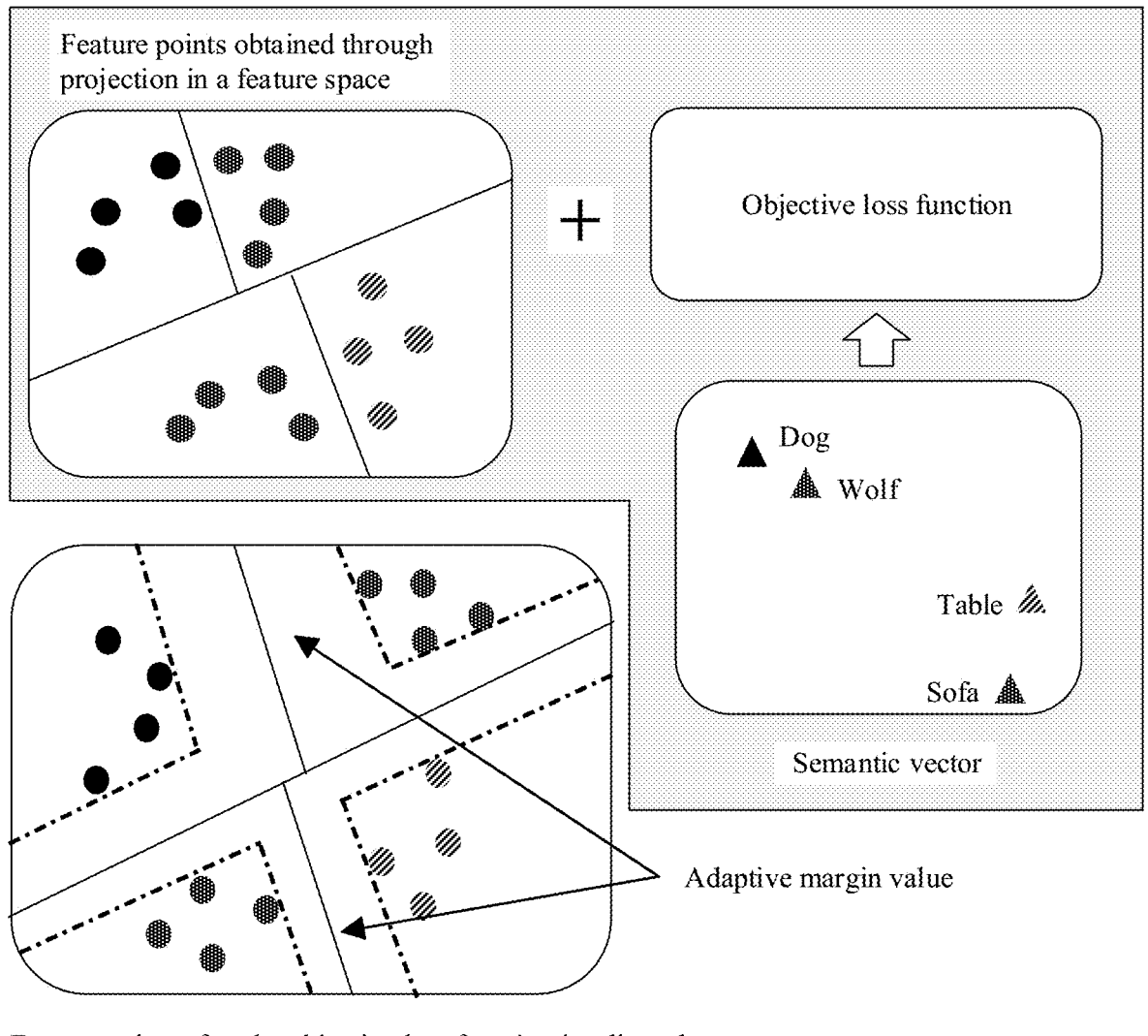
FIG. 7 is a schematic diagram of projection of a feature point in a feature space according to an embodiment of this disclosure.

First, images of a base class are obtained as a training set, where the base class is a sufficient quantity of training samples whose classes of images are labeled. Considering a calculation amount and a memory, training is performed in different stages. To be specific, the training set is divided into a plurality of training groups (namely, the foregoing meta-tasks), each training group corresponds to several classes of images, each training group includes images in several classes of images, samples in one training group are used for training each time, each training group is divided into a first set and a second set, and classes of images in the first set correspond to classes of images in the second set. For example, in FIG. 6, each training group has four classes of images, and labels of the classes of images are "dog", "wolf", "sofa", and "table". Then the labels of the classes of images are input to a semantic feature extraction module (for example, GloVe or word2vec), to obtain a semantic vector between every two of the classes of images, for example, a semantic vector between "dog" and "wolf", a semantic vector between "dog" and "sofa", a semantic vector between "dog" and "table", a semantic vector between "wolf" and "sofa", a semantic vector between "wolf" and "table", a semantic vector between "sofa" and "table". Then a margin value between every two of the classes of images is generated in the foregoing manner (for example, the objective operation formula or the neural network G, where the neural network G is used as an example in FIG. 6) based on the semantic vectors, for example, a margin value between "dog" and "wolf", a margin value between "dog" and "sofa", a margin value between "dog" and "table", a margin value between "wolf" and "sofa", a margin value between "wolf" and "table", and a margin value between "sofa" and "table". In addition, each training group is input to a prototype network F, and feature extraction is performed on each image by using the prototype network F to obtain a feature point of each image in the feature space. Then a position of each feature point in the feature space may be further measured by using a measurement module. After each feature point is obtained by performing feature extraction on each image in a first set in each training group by using the prototype network F, a prototype corresponding to a class of the image may be further calculated by using the measurement module. For example, as shown in FIG. 7, it is assumed that a first set in a current training group is 4-way-4-shot (to be specific, the first set has four classes of images, and each class of an image has four samples). In this case, four feature points obtained through extraction by using the prototype network F from four images whose classes of images are labeled as "dog" are used for calculating a prototype of "dog". Similarly, four feature points obtained through extraction by using the prototype network F from four images whose classes of images are labeled as "wolf", "sofa", or "table" are used for calculating a prototype of "wolf", "sofa" or "table". For an image (for example, a sample x) in a second set in each training group, first, $s_y(x)$ of the sample x may be calculated in the foregoing manner, to obtain the objective loss function described in the formula (3). Then network parameters of the prototype network F and the neural network G are trained by converging the objective loss function. It can be learned from FIG. 7 that, after the objective loss function is adjusted, based on points obtained by projecting images to the feature space by using the prototype network G, a distance between similar classes is larger (because a larger margin value is added between similar classes), and a distance between less similar classes is smaller (because a smaller margin value is added between less similar classes). In addition, if the margin value between every two of the classes of the images is not obtained by using the neural network G but is obtained by using the objective operation formula, a network parameter of the prototype network F and a parameter variable of the objective operation formula are trained by converging the objective loss function.

(2) Application Stage

After the prototype network F and the neural network G (or the objective operation formula) are trained in the foregoing training stage, the trained prototype network F and the measurement module may be directly deployed on a related execution device (for example, an end device such as a mobile phone or a tablet computer, or an edge device such as a camera) for testing or use. In an embodiment, a test image is input to the trained prototype network F, and after the trained prototype network F performs feature extraction on the test image to obtain a target feature point, the measurement module determines, through comparison, a specific class, of an image, whose prototype is closest to a position of the target feature point in the feature space. For example, if the position of the target feature point in the feature space is closest to a position of a prototype corresponding to "dog" in the feature space, a class of the test image is output as "dog".

It should be noted that few-shot learning includes standard few-shot learning and generalized few-shot learning. In the standard few-shot learning, a massive training set is given as a base class, and for a new class (which does not overlap the base class) that has never been seen before, a test sample of the new class is recognized by using a few training samples of each base class. A difference between the generalized few-shot learning and the standard few-shot learning lies in that test samples not only include a new class, but may also include an image sample of a base class. Therefore, in some embodiments of this disclosure, the foregoing embodiments may be applied not only to the standard few-shot learning, but also to the generalized few-shot learning. However, it should be noted that the foregoing prototype network is usually used for a standard few-shot learning problem, and for a generalized few-shot learning problem, in addition to the prototype network, a neural network with another structure may be alternatively used for training. Specifically, a conventional neural network with a "feature extractor+classifier" structure (which may be referred to as a neural network P) is used as an example for description. First, the neural network P is trained by using training data of a base class. A trained neural network P may be directly used for predicting a label of a test image under generalized few-shot learning settings. Specifically, there may be two operations. Operation 1: A "feature extractor+base classifier" structure of the neural network P is trained based on training data of a base class, where a loss function used for training is the objective loss function proposed in the foregoing embodiments of this disclosure, and a margin value between every two of classes of images is considered in the objective loss function. Operation 2: A "new classifier" is trained based on data of a new class, and finally, overall classification may be performed by using a trained base classifier and new classifier.

In addition, for a more intuitive understanding of beneficial effects brought by embodiments of this disclosure, the following performs further comparison on technical effects of embodiments of this disclosure. Referring to FIG. 8 and FIG. 9, FIG. 8 shows a result of comparison between this application and other few-shot learning methods. In this disclosure, 80 classes are selected from miniImageNet as base classes, and 20 classes are selected as new classes. To-be-classified test images are selected only from the new classes. 1 shot indicates that each new class has one sample in a training set, and 5 shot indicates that each new class has five samples. During each prediction, one of five candidate classes needs to be selected as a class of a given image. It can be learned from FIG. 8 that accuracy of the method described in the foregoing embodiments of this disclosure significantly surpasses that of other few-shot learning algorithms. FIG. 9 shows another result of comparison between this disclosure and other few-shot learning methods. In this disclosure, 389 classes are selected from ImageNet as base classes, and 611 classes are selected as new classes. Other settings are the same as those of the few-shot learning in FIG. 8. An only difference lies in that test samples are selected from both the new classes and the base classes, and each new class includes five training samples. An experiment effect is shown in FIG. 9. It can be learned from FIG. 9 that accuracy of the method described in the foregoing embodiments of this disclosure also significantly surpasses that of the other few-shot learning algorithms.

It should be further noted that the neural network training method described in the foregoing embodiments may be implemented on a cloud side. For example, a cloud-side training device (the training device may be disposed on one or more servers or virtual machines) may obtain a training set, and perform the training described in the foregoing embodiments on a neural network based on a plurality of groups of training data in the training set, to obtain a trained neural network. Then the trained neural network is sent to an execution device for application, for example, sent to a terminal device (for example, a personal computer, a computer workstation, a smartphone, a tablet computer, a smart car, a media consumer device, or a wearable device) or an edge device (for example, a camera or a monitor). For example, in the system architecture corresponding to FIG. 3, the training device 320 trains a prototype network, and then the trained prototype network 301 is sent to the execution device 310 for use. Alternatively, the neural network training method in the foregoing embodiments may be implemented on a terminal side, that is, a training device may be located on the terminal side. For example, a terminal device (for example, a personal computer, a computer workstation, a smartphone, a tablet computer, a smart car, a media consumer device, or a wearable device) or an edge device (for example, a camera or a monitor) may obtain a training set, and train a neural network based on a plurality of groups of training data in the training set to obtain a trained neural network. The trained neural network may be directly used on the terminal device, or may be sent by the terminal device to another device for use. Specifically, in this embodiment of this disclosure, a specific device (on a cloud side or a terminal side) on which the neural network is trained or applied is not limited.

Figure 10:
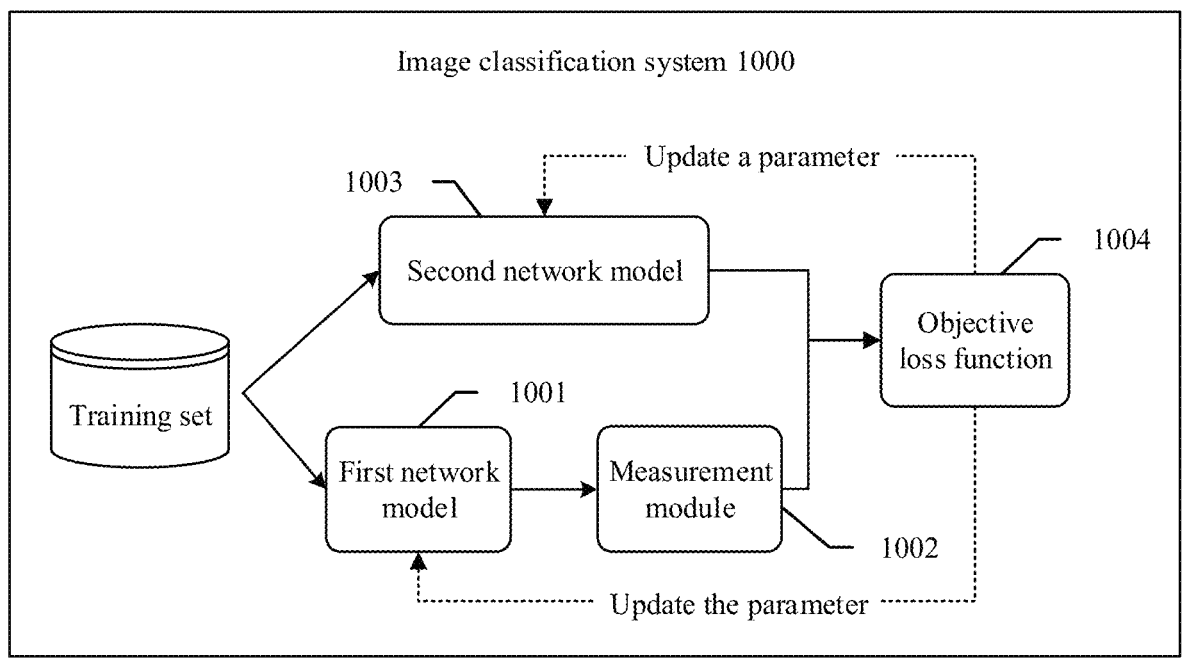
FIG. 10 is a schematic diagram of an image classification system according to an embodiment of this disclosure.

Based on the embodiments corresponding to FIG. 4 to FIG. 9, to better implement the foregoing solutions in embodiments of this disclosure, the following further provides a related device for implementing the foregoing solutions. In an embodiment, referring to FIG. 10, FIG. 10 is a schematic diagram of an image classification system according to an embodiment of this disclosure. The image classification system 1000 may include a first network model 1001, a measurement module 1002, a second network model 1003, and an objective loss function 1004. The first network model 1001 includes a prototype network, configured to perform feature extraction on a plurality of images in a first set in a training set and a plurality of images in a second set in the training set, to obtain first feature points, in a feature space, of the plurality of images in the first set, and second feature points, in the feature space, of the plurality of images in the second set, where classes of the plurality of images in the first set correspond to classes of the plurality of images in the second set. The measurement module 1002 is configured to calculate, based on the first feature points, a prototype corresponding to a class of each image, where the prototype is used for indicating a class center of a position, in the feature space, of a first feature point corresponding to a class of each image. The second network model 1003 is configured to obtain a semantic similarity between the classes of the plurality of images in the second set, and obtain a margin value between the classes of the plurality of images in the second set based on the semantic similarity, where the margin value is used for adjusting the objective loss function. The objective loss function 1004 is configured to: after being adjusted, train the prototype network based on the first feature points and the second feature points.

In the foregoing embodiment of this disclosure, first, feature extraction is performed on images in the training set (including the first set and the second set) by using the first network model 1001 (for example, the prototype network), to obtain a feature point, in the feature space, that corresponds to each image in the training set (including the first feature points corresponding to the images in the first set and the second feature points corresponding to the images in the second set). The measurement module 1002 is configured to calculate a prototype of each class of an image based on the first feature points (the prototype is used for indicating a class center of a position, in the feature space, of a first feature point corresponding to a class of each image). The second feature points are used for updating a network parameter of the first network model 1001 (the network parameter determines a position of a feature point obtained by projecting an image to the feature space). That is, the network parameter of the first network model 1001 needs to be learned by using the second feature points. If a value of a learned network parameter is desired, a distance between feature points, in the feature space, of images of a same class is short. Based on this, a desired objective loss function needs to be constructed. In this embodiment of this disclosure, first, the second network model 1003 obtains the semantic similarity between the classes of the plurality of images in the second set, and obtains the margin value between the classes of the plurality of images in the second set based on the semantic similarity. If semantic similarities between classes of images are different, margin values between the classes of the images are also different. Finally, the objective loss function 1004 is adjusted based on at least the margin value. After the objective loss function 1004 is adjusted, the first network model 1001 trains each image in the training set, so that a finally adjusted objective loss function 1004 reaches a preset value. In this embodiment of this disclosure, the adaptive margin value is introduced into the loss function of the first network model 1001. To be specific, a larger margin value is added between similar classes, and a smaller margin value is added between less similar classes, to adaptively adjust a margin between classes, so as to more easily distinguish between classes, thereby improving classification accuracy of the first network model 1001.

In an embodiment, the image classification system provided in this embodiment of this disclosure may further include more modules to implement more specific functions. In an embodiment, referring to FIG. 11, image classification system 1100 may include a first network model 1101, a measurement module 1102, a second network model 1103, and an objective loss function 1104. Functions of the first network model 1101, the measurement module 1102, the second network model 1103, and the objective loss function 1104 are similar to those of the first network model 1001, the measurement module 1002, the second network model 1003, and the objective loss function 1004 in FIG. 10. Details are not described herein again. In this embodiment of this disclosure, the second network model 1103 may further include a semantic feature extraction module 1131, a semantic similarity calculation module 1132, and a margin value calculation module 1133. The semantic feature extraction module 1131 is configured to extract semantic vectors corresponding to the classes of the images in the second set, where one class of an image corresponds to one semantic vector. The semantic similarity calculation module 1132 is configured to perform calculation on the semantic vectors corresponding to the classes of the images in the second set, to obtain the semantic similarity between the classes of the images in the second set. The margin value calculation module 1133 is configured to perform calculation on the semantic similarity between the classes of the images in the second set, to obtain a margin value between the classes of the images in the second set.

In the specific descriptions of the foregoing implementation of this disclosure, the second network model 1103 may be divided into more submodules based on implemented functions, each submodule is configured to implement a corresponding function, and the submodules cooperate with each other to implement a process of obtaining a semantic similarity based on a semantic vector. Portability is possible.

In an embodiment, the semantic similarity calculation module 1132 is configured to: calculate a Euclidean distance between a first semantic vector and a second semantic vector in the semantic vectors, and determine a semantic similarity between a class of a first image and a class of a second image in the classes of the images based on the Euclidean distance, where the class of the first image corresponds to the first semantic vector, and the class of the second image corresponds to the second semantic vector; or perform an inner product operation on the first semantic vector and the second semantic vector to obtain an inner product operation result, and determine the semantic similarity between the class of the first image and the class of the second image based on the inner product operation result.

In the foregoing embodiment of this disclosure, two manners of obtaining, by the semantic similarity calculation module 1132, a semantic similarity based on a semantic vector are specifically described. Flexibility is possible.

In an embodiment, the margin value calculation module 1133 may be an objective operation formula, and the objective operation formula is configured to perform a linear operation on the semantic similarity to obtain a margin value between every two of the classes of the images in the second set, where the objective operation formula includes at least one parameter variable.

In the descriptions of the foregoing implementation of this disclosure, the margin value calculation module 1133 may be an objective operation formula, and the margin value between every two of the classes of the images in the second set is obtained by using the objective operation formula. This manner is simple and convenient, has a small quantity of parameter variables, and makes training easy.

In an embodiment, the objective loss function 1104 is configured to: after being adjusted, adjust a value of the at least one parameter variable based on the first feature points and the second feature points in a process of training the prototype network (namely, the first network model 1101).

In the descriptions of the foregoing embodiment of this disclosure, when the margin value calculation module 1133 is the objective operation formula, in a process of training the prototype network, the objective operation formula and the prototype network need to be considered as a whole for performing joint training to reduce a quantity of training times and therefore reduce a calculation amount.

In an embodiment, the margin value calculation module 1133 may be alternatively a preset neural network, and the preset neural network is configured to perform an operation on the input semantic similarity, and output a margin value between every two of the classes of the images in the second set.

In the descriptions of the foregoing embodiment of this disclosure, the margin value calculation module 1133 may be the preset neural network, and the margin value between every two of the classes of the images in the second set is obtained by using the preset neural network. A network parameter class obtained through training in this manner is more accurate and has high accuracy.

In an embodiment, the objective loss function 1104 is configured to: after being adjusted, perform joint training on the prototype network (namely, the first network model 1101) and the preset neural network based on the first feature points and the second feature points.

In the descriptions of the foregoing embodiment of this disclosure, when the margin value calculation module 1133 is the preset neural network, in a process of training the prototype network, the preset neural network and the prototype network need to be considered as a whole for performing joint training to reduce a quantity of training times and therefore reduce a calculation amount.

In an embodiment, a network structure of the first network model 1001 or the first network model 1101 is not limited. The first network model 1001 or the first network model 1101 may be ResNet50, MobileNet, or Inception, provided that a function of the neural network is to perform feature extraction on a shot image to obtain a feature point in the feature space. A specific representation form of the first network model 1001 or the first network model 1101 is not specifically limited herein.

In the descriptions of the foregoing embodiment of this disclosure, the first network model 1001 or the first network model 1101 may have different representation forms. Selectivity is possible.

In an embodiment, the semantic feature extraction module 1131 may be GloVe or word2vec. This is not specifically limited herein. Any functional module capable of implementing a unique correspondence from a label (for example, various types of words or phrases such as dogs, books, or shrubs) of a class of an image to a semantic vector may be considered as the semantic feature extraction module 1131 in this embodiment of this disclosure.

Figure 11:
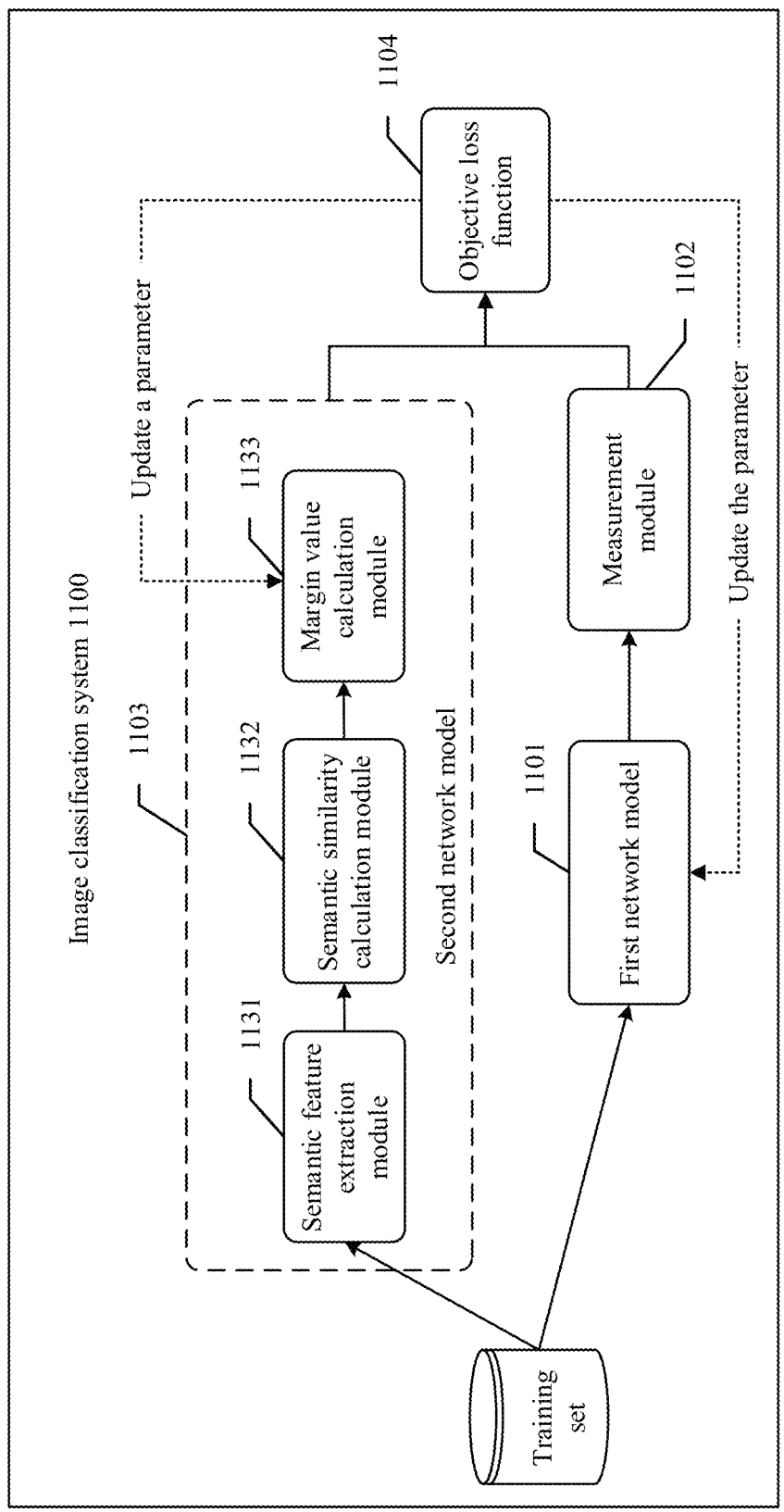
FIG. 11 is another schematic diagram of an image classification system according to an embodiment of this disclosure.
Figure 12:
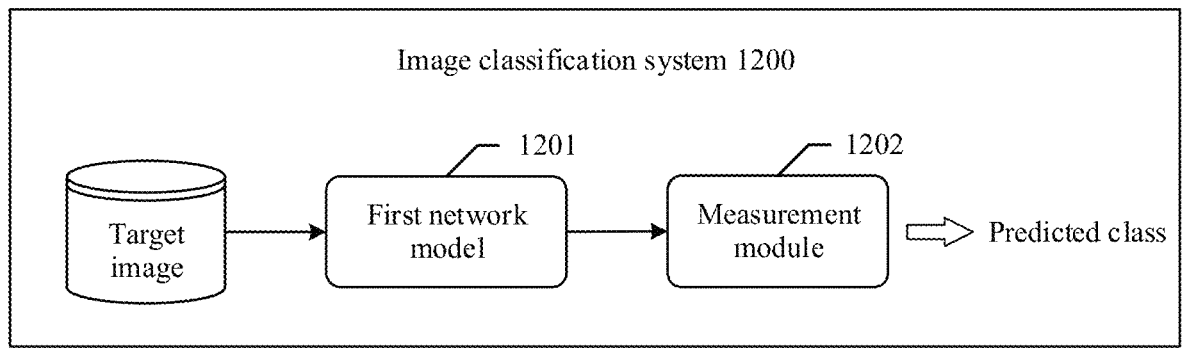
FIG. 12 is another schematic diagram of an image classification system according to an embodiment of this disclosure.

FIG. 12 is a schematic diagram of another image classification system according to an embodiment of this disclosure. The image classification system 1200 may include a first network model 1201 and a measurement module 1202. The first network model 1201 includes a trained prototype network (the trained first network model 1001 in FIG. 10 or the trained first network model 1101 in FIG. 11), and is configured to perform feature extraction on an obtained target image to obtain a target feature point in a feature space. The measurement module 1202 is configured to measure a position of the target feature point in the feature space, and output a predicted class of the target image, where the predicted class is a class, of an image, that corresponds to a prototype closest to the target feature point.

It should be noted that content such as information exchange and execution processes between the modules/units in the image classification system described in the embodiments corresponding to FIG. 10 to FIG. 12 and the method embodiments corresponding to FIG. 4 to FIG. 9 in this disclosure are based on a same concept. For specific content, refer to the descriptions in the foregoing method embodiments of this disclosure. Details are not described herein again.

The trained neural network in embodiments of this disclosure may be used to perform image classification processing in intelligent security protection, safe city, intelligent terminals, and other fields. For example, the trained prototype network in this disclosure may be used in various scenarios and issues, for example, some common tasks such as facial recognition, image classification, and object detection, in computer vision and other fields. Each type of scenario includes many application scenarios in which a prototype network model can be constructed by using this disclosure. The following describes a plurality of application scenarios implemented in products.

(1) Album Classification

A user stores a large quantity of pictures on a mobile phone and a cloud disk. Class-based management can be performed on an album by class to improve user experience. Pictures in an album can be classified by using the trained prototype network in embodiments of this disclosure, to obtain an album sorted or stored by class, so that the user can conveniently perform class-based management on different object classes and conveniently perform searching, thereby reducing a management time of the user and improving album management efficiency.

Figure 13:
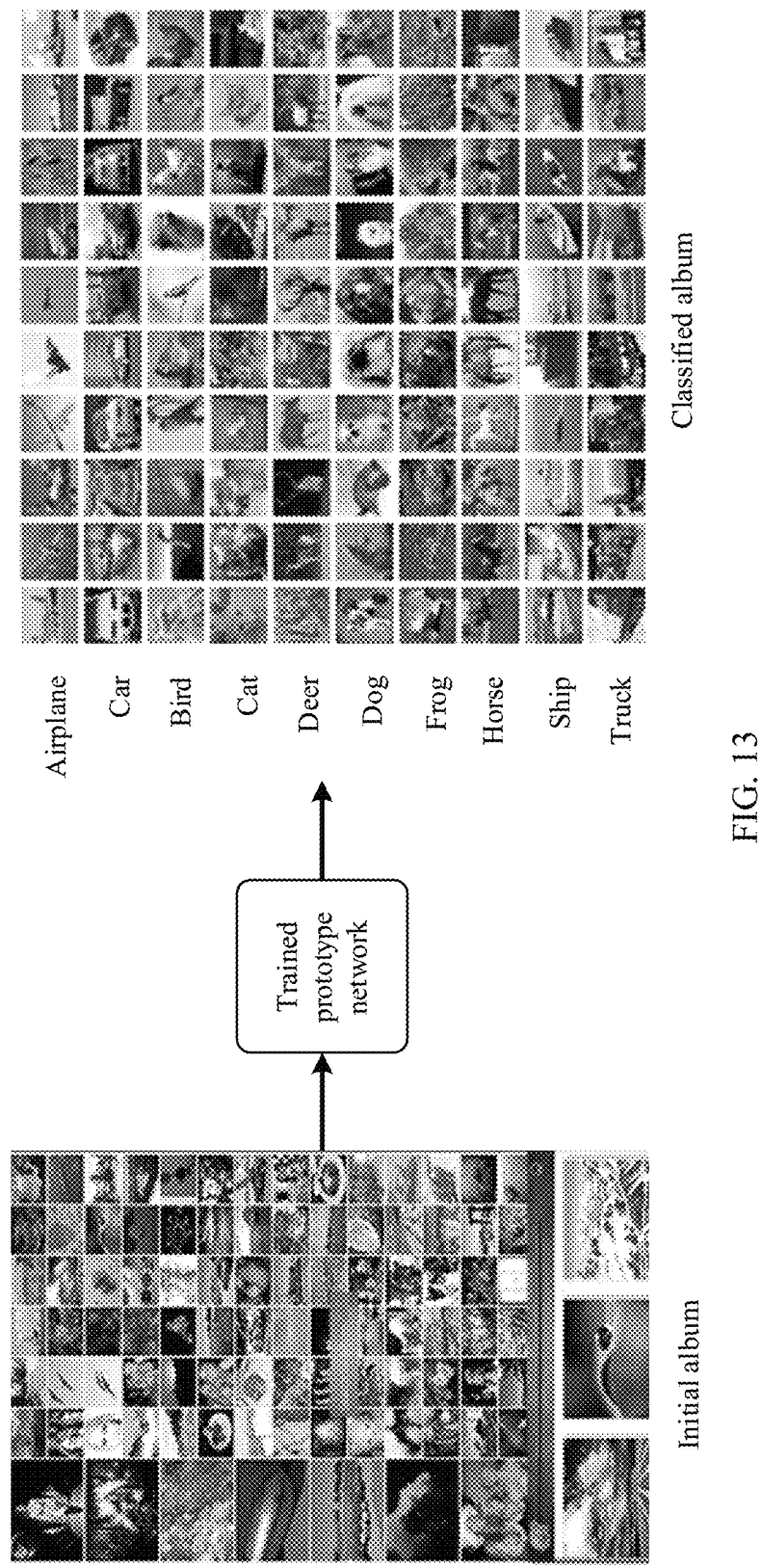
FIG. 13 is a schematic diagram of an application scenario according to an embodiment of this disclosure.

In an embodiment, as shown in FIG. 13, when classification is performed on an album by using the trained prototype network in embodiments of this disclosure, first, a picture in the album may be input to the trained prototype network for feature extraction. A measurement module measures a position of a feature point obtained through extraction in a feature space and a distance between the feature point and a prototype of another class of an image, and a class, of an image, that corresponds to a prototype closest to the feature point is selected as a class of the picture. After a class of an image of the picture is obtained, pictures in the album are classified based on the class of the image of the picture, to obtain an album sorted based on classes of images. When the pictures in the album are sorted based on the classes of images, pictures belonging to one class may be arranged in one row or in one column. For example, in a finally obtained album, pictures in the first row are all airplanes, and pictures in the second row are all cars.

(2) Object Recognition in Photographing

When a user takes a photo, the user may process a captured photo by using the trained prototype network in embodiments of this disclosure, so that a class of a photographed object can be automatically recognized. For example, the photographed object can be automatically recognized as a specific type of flower or animal or the like. Further, because the trained prototype network in embodiments of this disclosure is applicable to few-shot, when a photographed object is rarely seen and a system cannot provide an accurate class of an image (for example, a white-fronted goose), a superclass (for example, a bird) to which the object belongs may be recognized by using the trained prototype network in embodiments of this disclosure. For example, a photographed shared bicycle is recognized by using the trained prototype network in embodiments of this disclosure, and it can be recognized that the object is a bicycle. Further, information related to the bicycle may be further displayed. For details, refer to FIG. 14.

(3) Object Recognition in Intelligent Driving

In an automated driving application scenario, an image in image data or video data captured by a sensor (for example, a camera) mounted on a vehicle may be processed by using the trained prototype network in embodiments of this disclosure, so that classes of various obstacles on a road surface in a driving process can be automatically recognized. For example, whether there is an obstacle on a road surface in front of the vehicle and a type of an obstacle (for example, a key obstacle such as an oncoming truck, pedestrian, or cyclist, or a non-key obstacle such as bushes, a tree, or a building on the roadside) may be automatically recognized.

It should be understood that the album classification and the object recognition in photographing that are described above are only two specific scenarios to which the image classification method in embodiments of this disclosure is applied. The trained prototype network in embodiments of this disclosure is not limited to the foregoing scenarios in application, and the trained prototype network may be used in any scenario in which image classification or image recognition needs to be performed.

Figure 15:
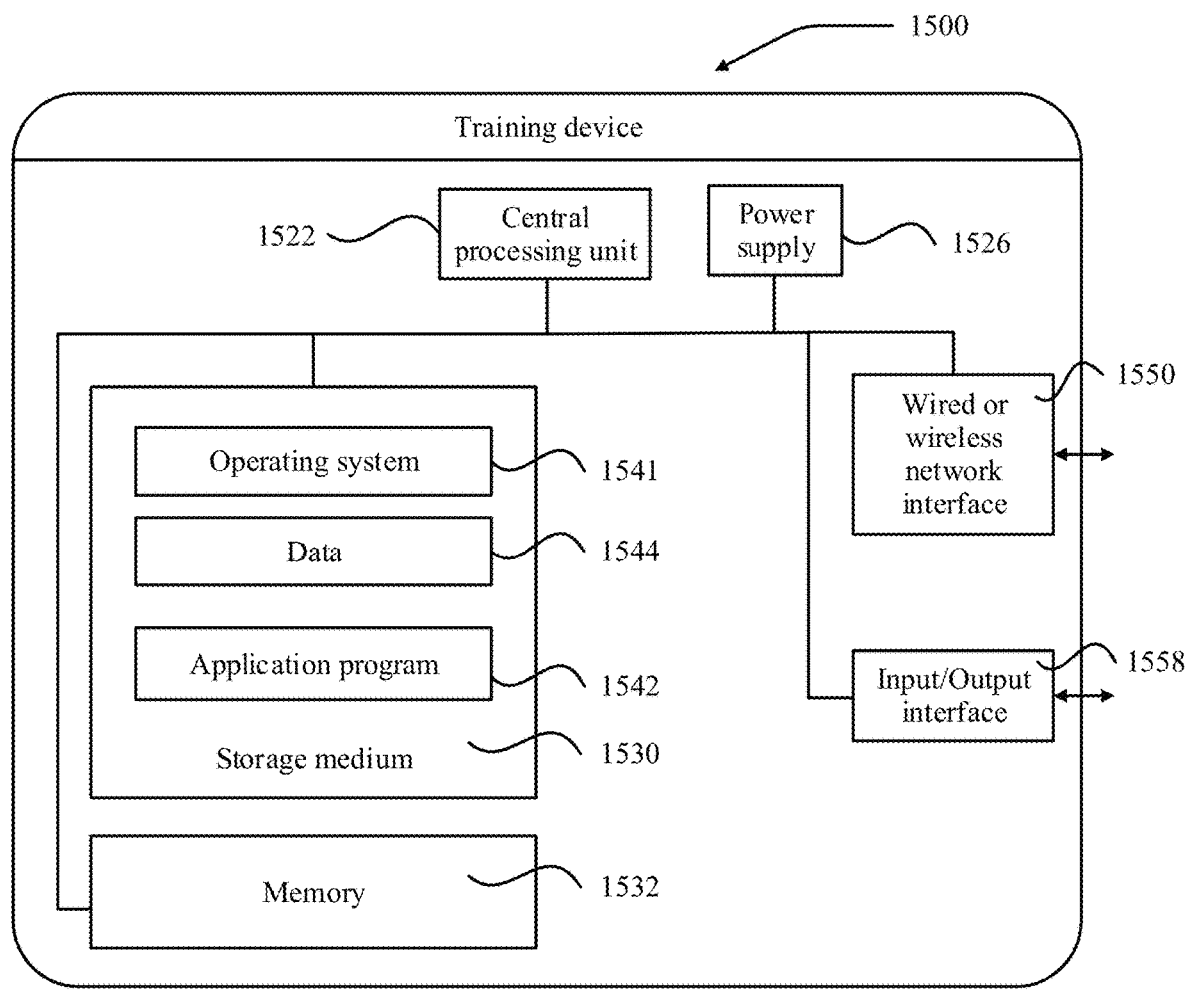
FIG. 15 is a schematic diagram of a training device according to an embodiment of this disclosure.

The following describes a training device provided in embodiments of this disclosure. FIG. 15 is a schematic diagram of a structure of a training device according to an embodiment of this disclosure. The image classification system described in the embodiments corresponding to FIG. 10 and FIG. 11 may be deployed on the training device 1500, to implement the functions of the image classification system in the embodiments corresponding to FIG. 10 and FIG. 11. In an embodiment, the training device 1500 is implemented by one or more servers. The training device 1500 may vary greatly due to different configurations or performance, and may include one or more central processing units (CPU) 1522, a memory 1532, and one or more storage media 1530 (for example, one or more mass storage devices) for storing an application program 1542 or data 1544. The memory 1532 and the storage medium 1530 may be transient storage or persistent storage. The program stored in the storage medium 1530 may include one or more modules (not shown in the figure), and each module may include a series of instruction operations for the training device 1500. Further, the central processing unit 1522 may be configured to communicate with the storage medium 1530, and perform, on the training device 1500, a series of instruction operations in the storage medium 1530.

The training device 1500 may further include one or more power supplies 1526, one or more wired or wireless network interfaces 1550, one or more input/output interfaces 1558, and/or one or more operating systems 1541, for example, Windows Server™, Mac OS X™, Unix™, Linux™, or FreeBSD™.

In this embodiment of this disclosure, the central processing unit 1522 is configured to perform the neural network training method performed by the training device in the embodiment corresponding to FIG. 4. In an embodiment, the central processing unit 1522 is configured to obtain a training set, where the training set includes a first set and a second set, and classes of images in the first set correspond to classes of images in the second set. Then feature extraction is performed on images in the training set by using a prototype network, to obtain feature points, in a feature space, of the images in the training set, where the feature points include first feature points corresponding to a plurality of images in the first set and second feature points corresponding to a plurality of images in the second set, the first feature points are used for calculating a prototype corresponding to each class of an image, and the prototype is used for indicating a class center of a position, in the feature space, of a first feature point corresponding to each class of an image. In addition, a semantic similarity between classes of the plurality of images in the second set is further obtained, and a margin value between the classes of the plurality of images in the second set is obtained based on the semantic similarity. Then an objective loss function is adjusted based on at least the margin value. Finally, the prototype network is trained based on the first feature points and the second feature points by using an adjusted objective loss function, until the adjusted objective loss function reaches a preset value.

In an embodiment, the central processing unit 1522 is further configured to extract, by using a semantic feature extraction module, semantic vectors corresponding to the classes of images in the second set, where one class of an image corresponds to one semantic vector; and then calculate a Euclidean distance between a first semantic vector and a second semantic vector in the semantic vectors, and determine a semantic similarity between a class of a first image and a class of a second image in the classes of the images based on the Euclidean distance, where the class of the first image corresponds to the first semantic vector, and the class of the second image corresponds to the second semantic vector.

In an embodiment, the central processing unit 1522 is further configured to extract, by using the semantic feature extraction module, semantic vectors corresponding to the classes of the images in the second set, where one class of an image corresponds to one semantic vector; then perform an inner product operation on a first semantic vector and a second semantic vector in the semantic vectors to obtain an inner product operation result; and finally, determine a semantic similarity between a class of a first image and a class of a second image in the classes of the images based on the inner product operation result, where the class of the first image corresponds to the first semantic vector, and the class of the second image corresponds to the second semantic vector.

In an embodiment, the central processing unit 1522 is further configured to perform, by using an objective operation formula, a linear operation on the semantic similarity to obtain a margin value between every two of the classes of the images in the second set, where the objective operation formula includes at least one parameter variable.

In an embodiment, the central processing unit 1522 is further configured to adjust a value of the at least one parameter variable in a process of training the prototype network by using the adjusted objective loss function.

In an embodiment, the central processing unit 1522 is further configured to use the semantic similarity as input of a preset neural network to obtain an output result, where the output result is the margin value between every two of the classes of the images in the second set.

In an embodiment, the central processing unit 1522 is further configured to perform joint training on the prototype network and the preset neural network by using the adjusted objective loss function.

In an embodiment, the central processing unit 1522 is further configured to output a trained prototype network.

In an embodiment, the central processing unit 1522 is further configured to perform feature extraction on a target image by using the trained prototype network, to obtain a target feature point in the feature space, and then output a predicted class of the target image, where the predicted class is a class, of an image, that corresponds to a prototype closest to the target feature point.

It should be noted that a specific manner of performing the foregoing operations by the central processing unit 1522 and the method embodiment corresponding to FIG. 8 in this disclosure are based on a same concept, and a technical effect brought by the specific manner is the same as that in the embodiment corresponding to FIG. 8 in this disclosure. For specific content, refer to the descriptions in the foregoing method embodiments of this disclosure. Details are not described herein again.

Figure 16:
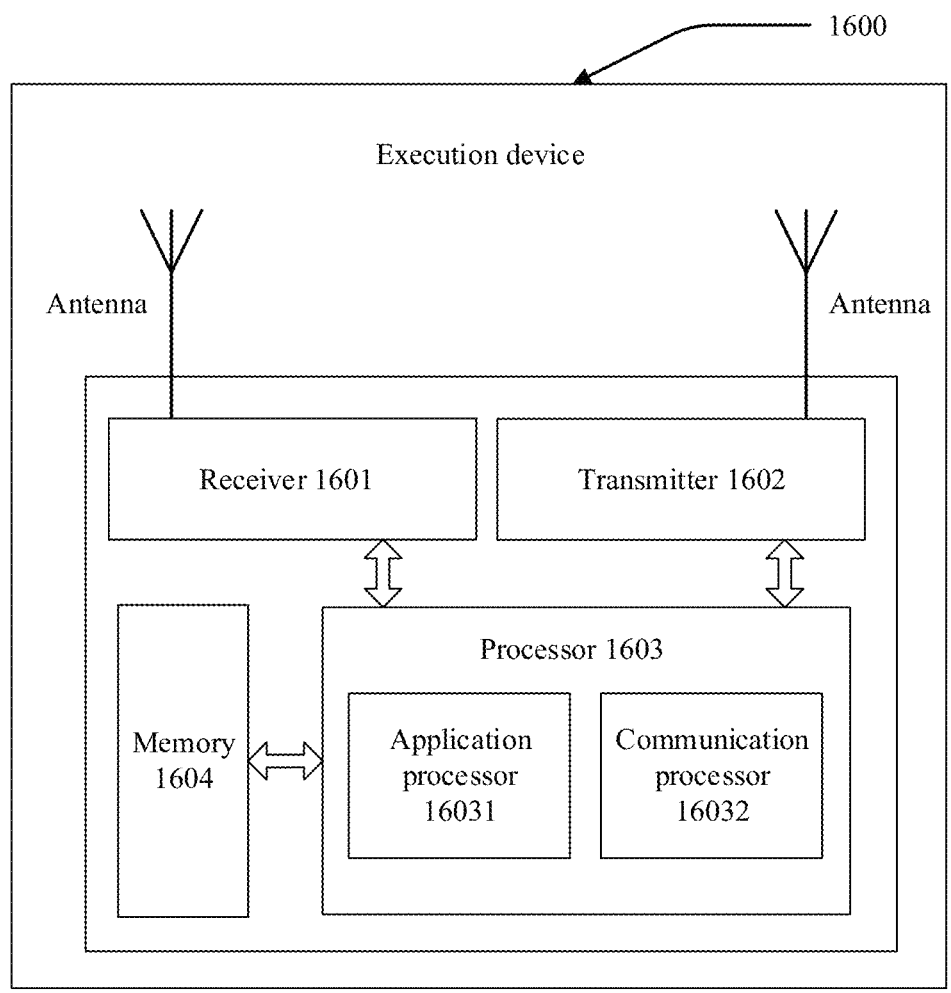
FIG. 16 is a schematic diagram of an execution device according to an embodiment of this disclosure.

The following describes an execution device provided in embodiments of this disclosure. FIG. 16 is a schematic diagram of a structure of an execution device according to an embodiment of this disclosure. The execution device 1600 may be embodied as various terminal devices, for example, a virtual reality (VR) device, a mobile phone, a tablet computer, a notebook computer, an intelligent wearable device, a monitoring data processing device, or a radar data processing device. This is not limited herein. The image classification system described in the embodiment corresponding to FIG. 12 may be deployed on the execution device 1600, to implement the functions of the image classification system in the embodiment corresponding to FIG. 12. Specifically, the execution device 1600 includes a receiver 1601, a transmitter 1602, a processor 1603 (there may be one or more processors 1603 in the execution device 1600, and one processor is used as an example in FIG. 16), and a memory 1604. The processor 1603 may include an application processor 16031 and a communication processor 16032. In some embodiments of this disclosure, the receiver 1601, the transmitter 1602, the processor 1603, and the memory 1604 may be connected by using a bus or in another manner.

The memory 1604 may include a read-only memory and a random access memory, and provide instructions and data to the processor 1603. A part of the memory 1604 may further include a non-volatile random access memory (non-volatile random access memory, NVRAM). The memory 1604 stores processor and operation instructions, executable modules or data structures, or a subset thereof, or an extended set thereof. The operation instructions may include various operation instructions for implementing various operations.

The processor 1603 controls operations of the execution device 1600. In a specific application, components of the execution device 1600 are coupled together by using a bus system. In addition to a data bus, the bus system may further include a power bus, a control bus, and a status signal bus. However, for clear description, various types of buses in the figure are marked as the bus system.

The method disclosed in the embodiment corresponding to FIG. 4 in this disclosure may be applied to the processor 1603 or implemented by the processor 1603. The processor 1603 may be an integrated circuit chip and has a signal processing capability. In an implementation process, the operations in the foregoing method may be implemented by using a hardware integrated logic circuit in the processor 1603, or by using instructions in a form of software. The processor 1603 may be a general-purpose processor, a digital signal processor (DSP), a microprocessor or a microcontroller, an application-specific integrated circuit (ASIC), a field programmable gate array (FPGA) or another programmable logic device, a discrete gate or transistor logic device, or a discrete hardware component. The processor 1603 may implement or perform the methods, operations, and logical block diagrams that are disclosed in the embodiment corresponding to FIG. 12 in this disclosure. The general-purpose processor may be a microprocessor, or the processor may be any conventional processor or the like. The operations in the methods disclosed with reference to embodiments of this disclosure may be directly performed and completed by a hardware decoding processor, or may be performed and completed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in the memory 1604, and the processor 1603 reads information in the memory 1604 and completes the operations in the foregoing methods in combination with hardware of the processor.

The receiver 1601 may be configured to receive input digit or character information and generate signal input related to related settings and function control of the execution device 1600. The transmitter 1602 may be configured to output digit or character information through a first interface. The transmitter 1602 may be further configured to send an instruction to a disk group through the first interface, to modify data in the disk group. The transmitter 1602 may further include a display device, for example, a display.

An embodiment of this disclosure further provides a computer-readable storage medium. The computer-readable storage medium stores a program for signal processing. When the program is run on a computer, the computer is enabled to perform the operations performed by the execution device in the descriptions of the foregoing embodiments.

The training device, the execution device, or the like provided in embodiments of this disclosure may be a chip. The chip includes a processing unit and a communication unit. For example, the processing unit may be a processor, and the communication unit may be an input/output interface, a pin, or a circuit. The processing unit may execute computer-executable instructions stored in a storage unit, so that a chip in the training device performs the neural network training method described in the embodiments shown in FIG. 4 to FIG. 9. Optionally, the storage unit is a storage unit in the chip, for example, a register or a cache. Alternatively, the storage unit may be a storage unit that is in the training device and that is located outside the chip, for example, a read-only memory (ROM), another type of static storage device capable of storing static information and instructions, or a random access memory (RAM).

Figure 17:
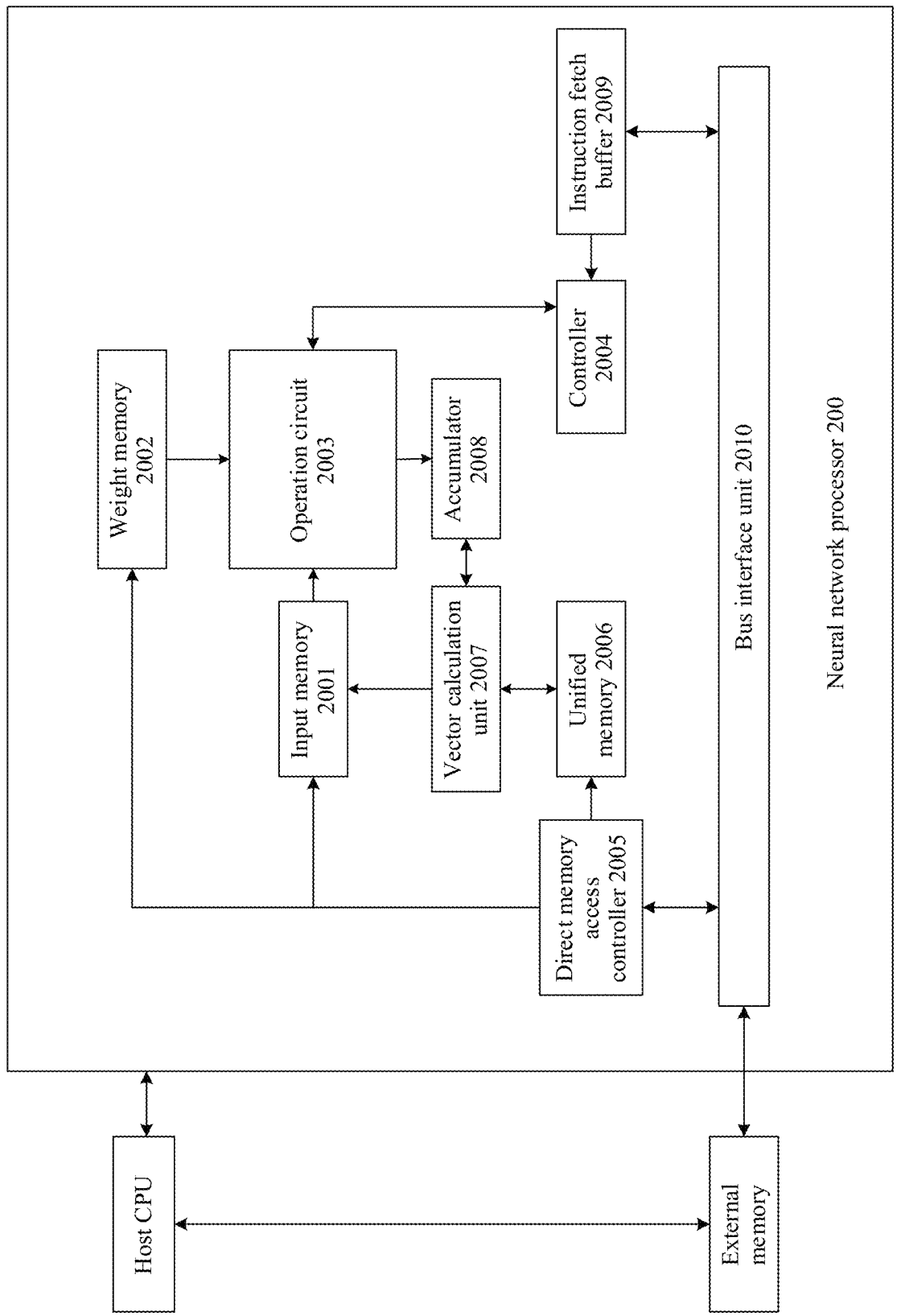
FIG. 17 is a schematic diagram of a structure of a chip according to an embodiment of this disclosure.

In an embodiment, referring to FIG. 17, FIG. 17 is a schematic diagram of a structure of a chip according to an embodiment of this disclosure. The chip may be embodied as a neural network processor NPU 200. The NPU 200 is mounted to a host CPU as a coprocessor, and the host CPU allocates a task. A core part of the NPU is an operation circuit 2003, and a controller 2004 controls the operation circuit 2003 to extract matrix data in a memory and perform a multiplication operation.

In some embodiments, the operation circuit 2003 includes a plurality of processing elements (PE). In some embodiments, the operation circuit 2003 is a two-dimensional systolic array. Alternatively, the operation circuit 2003 may be a one-dimensional systolic array or another electronic circuit capable of performing mathematic operations such as multiplication and addition. In some embodiments, the operation circuit 2003 is a general-purpose matrix processor.

For example, it is assumed that there are an input matrix A, a weight matrix B, and an output matrix C. The operation circuit obtains data corresponding to the matrix B from a weight memory 2002, and buffers the data to each PE in the operation circuit. The operation circuit obtains data of the matrix A from an input memory 2001, and performs a matrix operation on the matrix B and the data of the matrix A. Partial results or final results of a matrix that are obtained are stored in an accumulator 2008.

The unified memory 2006 is configured to store input data and output data. Weight data is directly transferred to the weight memory 2002 through a direct memory access controller (DMAC) 2005. Input data is also transferred to the unified memory 2006 through the DMAC.

A BIU is a bus interface unit, namely, a bus interface unit 2010, and is used for interaction between an AXI bus, and the DMAC and an instruction fetch buffer (IFB) 2009.

The bus interface unit (BIU) 2010 is used for the instruction fetch buffer 2009 to obtain instructions from an external memory, and is further used for the direct memory access controller 2005 to obtain original data of the input matrix A or the weight matrix B from the external memory.

The DMAC is mainly configured to transfer input data in the external memory DDR to the unified memory 2006, transfer weight data to the weight memory 2002, or transfer input data to the input memory 2001.

A vector calculation unit 2007 includes a plurality of operation processing units, and if required, performs further processing, for example, vector multiplication, vector addition, an exponential operation, a logarithm operation, or a magnitude comparison, on output of the operation circuit. The vector calculation unit 2007 is mainly used for network calculation, for example, batch normalization, pixel-level summation, or upsampling on a feature plane, at a non-convolutional/fully-connected layer of a neural network.

In some embodiments, the vector calculation unit 2007 can store a vector of processed output to the unified memory 2006. For example, the vector calculation unit 2007 may apply a linear function and/or a non-linear function to output of the operation circuit 2003, for example, perform linear interpolation on a feature plane extracted by a convolutional layer, or for another example, use a vector of an accumulated value to generate an activation value. In some embodiments, the vector calculation unit 2007 generates a normalized value, a value obtained through pixel-level summation, or both. In some embodiments, the vector of the processed output can be used as activation input to the operation circuit 2003, for example, for use at a subsequent layer of the neural network.

The instruction fetch buffer 2009 connected to the controller 2004 is configured to store instructions to be used by the controller 2004.

The unified memory 2006, the input memory 2001, the weight memory 2002, and the instruction fetch buffer 2009 are all on-chip memories. The external memory is private to a hardware architecture of the NPU.

Any aforementioned processor may be a central processing unit, a microprocessor, an ASIC, or one or more integrated circuits configured to control execution of a program for the method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on an actual requirement to achieve the objectives of the solutions of the embodiments. In addition, in the accompanying drawings of the apparatus embodiments provided in this disclosure, connection relationships between modules indicate that the modules have communication connections with each other, which may be implemented as one or more communication buses or signal cables.

Based on the description of the foregoing embodiments, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this disclosure, software program implementation is a better implementation in most cases. Based on such an understanding, technical solutions of this disclosure essentially, or a part contributing to a conventional technology may be implemented in a form of a computer software product. The computer software product is stored in a readable storage medium, for example, a floppy disk of a computer, a USB flash drive, a removable hard disk, a ROM, a RAM, a magnetic disk, or an optical disc, and includes several instructions for instructing a computer device (which may be a personal computer, a training device, a network device, or the like) to perform the methods described in embodiments of this disclosure.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedures or functions according to the embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A neural network training method, comprising:
   obtaining a training set having a first set of a plurality of images and a second set of a plurality of images, wherein classes of the plurality of images in the first set correspond to classes of the plurality of images in the second set;
   performing feature extraction on the plurality of images in the first set and the plurality of images in the second set using a prototype network, to obtain a first feature point of the plurality of images in the first set and a second feature point of the plurality of images in the second set in a feature space, wherein
   the first feature point is used for calculating a prototype corresponding to a class of an image for indicating a class center of a position of the first feature point;
   obtaining a semantic similarity between the classes of the plurality of images in the second set, and obtaining a margin value between the classes of the plurality of images in the second set based on the semantic similarity;
   adjusting an objective loss function based on the margin value; and
   training the prototype network based on the first feature point and the second feature point using the adjusted objective loss function.

2. The method according to claim 1, wherein obtaining the semantic similarity between the classes of the plurality of images in the second set comprises:
   extracting a plurality of semantic vectors corresponding to the classes of the plurality of images in the second set respectively using a semantic feature extraction module;
   calculating a Euclidean distance between a first semantic vector and a second semantic vector in the plurality of semantic vectors; and
   determining a semantic similarity between a class of a first image corresponding to the first semantic vector and a class of a second image corresponding to the second semantic vector in the classes of the plurality of images based on the Euclidean distance.

3. The method according to claim 1, wherein obtaining the semantic similarity between the classes of the plurality of images in the second set comprises:
   extracting a plurality of semantic vectors corresponding to the classes of the plurality of images in the second set respectively using a semantic feature extraction module;
   performing an inner product operation between a first semantic vector and a second semantic vector in the plurality of semantic vectors, to obtain an inner product operation result; and
   determining a semantic similarity between a class of a first image corresponding to the first semantic vector and a class of a second image corresponding to the second semantic vector in the classes of the plurality of images based on the inner product operation result.

4. The method according to claim 1, wherein obtaining the margin value between the classes of the plurality of images in the second set based on the semantic similarity comprises:
   performing a linear operation on the semantic similarity using an objective operation formula, to obtain a margin value between every two of the classes of the images in the second set.

5. The method according to claim 4, wherein training the prototype network using the adjusted objective loss function comprises:
   adjusting a value of at least one parameter variable of the objective operation formula.

6. The method according to claim 1, wherein obtaining the margin value between the classes of the plurality of images in the second set based on the semantic similarity comprises:
   using the semantic similarity as an input of a preset neural network to obtain an output result, wherein the output result comprises a margin value between every two of the classes of the images in the second set.

7. The method according to claim 6, further comprising:
   performing joint training on the prototype network and the preset neural network using the adjusted objective loss function.

8. The method according to claim 1, wherein after training the prototype network based on the first feature point and the second feature point, the method further comprises:
   outputting the trained prototype network.

9. The method according to claim 8, further comprising:
   performing feature extraction on a target image by using the trained prototype network, to obtain a target feature point in the feature space; and
   outputting a predicted class of the target image corresponding to a prototype closest to the target feature point.

10. A training device, comprising:
    a processor and a memory
    to store a program instructions, which
    when executed by the processor, cause the training device to perform operations, the operations comprising:
    obtaining a training set having a first set of a plurality of images and a second set of a plurality of images, wherein classes of the plurality of images in the first set correspond to classes of the plurality of images in the second set;
    performing feature extraction on the plurality of images in the first set and the plurality of images in the second set using a prototype network, to obtain a first feature point, of the plurality of images in the first set and a second feature point of the plurality of images in the second set in a feature space, wherein
    the first feature point is used for calculating a prototype corresponding to a class of an image, and the prototype is used for indicating a class center of a position, in the feature space, of the first feature point;
    obtaining a semantic similarity between the classes of the plurality of images in the second set, and obtaining a margin value between the classes of the plurality of images in the second set based on the semantic similarity;
    adjusting an objective loss function based on the margin value; and
    training the prototype network based on the first feature point and the second feature point using the adjusted objective loss function.

11. The training device according to claim 10, wherein obtaining the semantic similarity between the classes of the plurality of images in the second set comprises:
  extracting a plurality of semantic vectors corresponding to the classes of the plurality of images in the second set respectively using a semantic feature extraction module;
  calculating a Euclidean distance between a first semantic vector and a second semantic vector in the plurality of semantic vectors; and
  determining a semantic similarity between a class of a first image corresponding to the first semantic vector and a class of a second image corresponding to the second semantic vector in the classes of the plurality of images based on the Euclidean distance.

12. The training device according to claim 10, wherein the obtaining the semantic similarity between the classes of the plurality of images in the second set comprises:
  extracting a plurality of semantic vectors corresponding to the classes of the plurality of images in the second set respectively using a semantic feature extraction module;
  performing an inner product operation between a first semantic vector and a second semantic vector in the plurality of semantic vectors, to obtain an inner product operation result; and
  determining a semantic similarity between a class of a first image corresponding to the first semantic vector and a class of a second image corresponding to the second semantic vector in the classes of the plurality of images based on the inner product operation result.

13. The training device according to claim 10, wherein obtaining the margin value between the classes of the plurality of images in the second set based on the semantic similarity comprises:
  performing a linear operation on the semantic similarity using an objective operation formula, to obtain a margin value between every two of the classes of the images in the second set.

14. The training device according to claim 13, wherein training the prototype network using the adjusted objective loss function comprises:
  adjusting a value of at least one parameter variable of the objective operation formula.

15. The training device according to claim 10, wherein obtaining the margin value between the classes of the plurality of images in the second set based on the semantic similarity comprises:
  using the semantic similarity as an input of a preset neural network to obtain an output result, wherein the output result comprises a margin value between every two of the classes of the images in the second set.

16. The training device according to claim 15, wherein training the prototype network using an adjusted objective loss function comprises:
  performing joint training on the prototype network and the preset neural network using the adjusted objective loss function.

17. The training device according to claim 10, wherein after training the prototype network based on the first feature point and the second feature point, the operations further comprise:
  outputting the trained prototype network.

18. The training device according to claim 17, wherein the operations further comprise:
  performing feature extraction on a target image using the trained prototype network, to obtain a target feature point in the feature space; and
  outputting a predicted class of the target image corresponding to a prototype closest to the target feature point.

19. A non-transitory computer-readable storage medium having instructions stored therein, which when executed by a computer to perform operations, the operations comprising:
  obtaining a training set having a first set of a plurality of images and a second set of a plurality of images, wherein classes of the plurality of images in the first set correspond to classes of the plurality of images in the second set;
  performing feature extraction on the plurality of images in the first set and the plurality of images in the second set using a prototype network, to obtain a first feature point, of the plurality of images in the first set and a second feature point of the plurality of images in the second set in a feature space, wherein
  the first feature point is used for calculating a prototype corresponding to a class of an image, and the prototype is used for indicating a class center of a position, in the feature space, of the first feature point;
  obtaining a semantic similarity between the classes of the plurality of images in the second set, and obtaining a margin value between the classes of the plurality of images in the second set based on the semantic similarity;
  adjusting an objective loss function based on the margin value; and
  training the prototype network based on the first feature point and the second feature point and using the adjusted objective loss function.

20. The non-transitory computer-readable storage medium according to claim 19, wherein the obtaining the semantic similarity between the classes of the plurality of images in the second set comprises:
  extracting a plurality of semantic vectors corresponding to the classes of the plurality of images in the second set respectively using a semantic feature extraction module;
  calculating a Euclidean distance between a first semantic vector and a second semantic vector in the plurality of semantic vectors; and
  determining a semantic similarity between a class of a first image corresponding to the first semantic vector and a class of a second image corresponding to the second semantic vector in the classes of the plurality of images based on the Euclidean distance.

* * * * *